US012536941B2

(12) United States Patent
Lee

(10) Patent No.: US 12,536,941 B2
(45) Date of Patent: Jan. 27, 2026

(54) DISPLAY APPARATUS, METHOD OF DRIVING THE SAME AND ELECTRONIC APPARATUS INCLUDING THE SAME

(71) Applicant: Samsung Display Co., Ltd., Yongin-si (KR)

(72) Inventor: Heechul Lee, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 18/984,955

(22) Filed: Dec. 17, 2024

(65) Prior Publication Data

US 2025/0259583 A1 Aug. 14, 2025

(30) Foreign Application Priority Data

Feb. 14, 2024 (KR) ........................ 10-2024-0021380

(51) Int. Cl.
*G09G 3/20* (2006.01)

(52) U.S. Cl.
CPC ... *G09G 3/2007* (2013.01); *G09G 2300/0819* (2013.01); *G09G 2300/0861* (2013.01); *G09G 2310/06* (2013.01); *G09G 2310/08* (2013.01); *G09G 2320/0233* (2013.01); *G09G 2320/043* (2013.01); *G09G 2320/045* (2013.01); *G09G 2330/12* (2013.01); *G09G 2360/148* (2013.01)

(58) Field of Classification Search
CPC ......... G09G 3/2007; G09G 2300/0861; G09G 2300/0819; G09G 2310/06; G09G 2310/08; G09G 2320/0233; G09G 2320/043; G09G 2320/045; G09G 2330/12; G09G 2360/148
USPC .......................................................... 345/207
See application file for complete search history.

(56) References Cited

U.S. PATENT DOCUMENTS

| | | | | |
|---|---|---|---|---|
| 2013/0106823 | A1* | 5/2013 | Kishi | G09G 3/3233 345/76 |
| 2021/0027712 | A1* | 1/2021 | Kim | G09G 3/3233 |
| 2022/0059037 | A1* | 2/2022 | Bae | H10K 59/1213 |
| 2022/0375413 | A1* | 11/2022 | Pyun | G09G 3/3275 |
| 2024/0038167 | A1* | 2/2024 | Huangfu | G09G 3/3233 |
| 2024/0221647 | A1* | 7/2024 | An | G09G 3/3233 |
| 2024/0428731 | A1* | 12/2024 | Han | G09G 3/3233 |
| 2025/0095585 | A1* | 3/2025 | Zhang | G09G 3/3233 |

(Continued)

OTHER PUBLICATIONS

In, H., et al.; "Current-Sensing and Voltage-Feedback Driving Method for Large-Area High-Resolution Active Matrix Organic Light Emitting Diodes", Japanese Journal of Applied Physics, Apr. 2006; 7 Pages. DOI:10.1143/JJAP.45.4396.

(Continued)

*Primary Examiner* — Tom V Sheng
(74) *Attorney, Agent, or Firm* — CANTOR COLBURN LLP

(57) ABSTRACT

A display apparatus includes a display panel, a data driver and a memory, wherein the display panel includes a first pixel. The data driver is configured to output a grayscale data voltage corresponding to input image data provided to the first pixel in a driving mode and an output of a sensing data voltage, which is gradually decreased, to the first pixel in a sensing mode. Additionally, the memory is configured to store a turned-on voltage at a turned-on time point of a first switching element of the first pixel as the sensing data voltage gradually decreases in the sensing mode.

22 Claims, 20 Drawing Sheets

(56) References Cited

U.S. PATENT DOCUMENTS

| | | | | |
|---|---|---|---|---|
| 2025/0124867 | A1* | 4/2025 | Kim | G09G 3/3233 |
| 2025/0174165 | A1* | 5/2025 | Park | G09G 3/3233 |

OTHER PUBLICATIONS

Seong, J., et al.; "CMOS Backplane Pixel Circuit With Leakage and Voltage Drop Compensation for an Micro-LED Display Achieving 5000 PPI or Higher", IEEE Access; vol. 8, 2020, Mar. 10, 2020, 10 Pages. Electronic ISSN: 2169-3536.

* cited by examiner

DISPLAY APPARATUS, METHOD OF DRIVING THE SAME AND ELECTRONIC APPARATUS INCLUDING THE SAME

This application claims priority to Korean Patent Application No. 10-2024-0021380, filed on Feb. 14, 2024, and all the benefits accruing therefrom under 35 U.S.C. § 119, the content of which in its entirety is herein incorporated by reference in their entireties.

BACKGROUND

1. Field

The invention relates to a display apparatus, a method of driving the display apparatus and an electronic apparatus including the display apparatus, and more particularly to a display apparatus which compensates for a threshold voltage of a driving switching element, a method of driving the display apparatus and an electronic apparatus including the display apparatus.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller, where the gate driver outputs gate signals to the gate lines, the data driver outputs data voltages to the data lines and the emission driver outputs emission signals to the emission lines. The driving controller controls the gate driver, the data driver and the emission driver.

A display quality of the display panel may be deteriorated due to threshold voltage variations of the driving switching elements of the pixels. When the pixel includes a compensation transistor for compensating the threshold voltage of the driving switching element, a structure of the pixel may be complex so that the display apparatus may not support a high resolution.

SUMMARY

Embodiments of the invention provide a display apparatus capable of compensating for a threshold voltage of a driving switching element by sensing whether the driving switching element is turned on while gradually decreasing a sensing data voltage in a sensing mode.

Embodiments of the invention provide a method of driving the display apparatus.

Embodiments of the invention provide an electronic apparatus including the display apparatus.

In an embodiment, the display apparatus includes a display panel, a data driver and a memory where the display panel includes a first pixel. The data driver is configured to output a grayscale data voltage corresponding to input image data to the first pixel in a driving mode and output a sensing data voltage, which is being gradually decreased, to the first pixel in a sensing mode. The memory is configured to store a turned-on voltage at a turned-on time point of a first switching element of the first pixel as the sensing data voltage gradually decreases in the sensing mode.

In an embodiment, the first pixel may include the first switching element including a control electrode connected to a first node, a first electrode connected to a second node and a second electrode connected to a third node, a second switching element including a control electrode configured to receive a writing gate signal, a first electrode configured to receive the grayscale data voltage and the sensing data voltage, and a second electrode connected to the first node, a third switching element including a control electrode configured to receive an emission signal, a first electrode connected to the third node, and a second electrode connected to a fourth node, a fourth switching element including a control electrode configured to receive an initialization gate signal, a first electrode connected to the first node, and a second electrode configured to receive an initialization voltage, a storage capacitor including a first electrode configured to receive a first power voltage and a second electrode connected to the first node, and a light emitting element including a first electrode connected to the fourth node and a second electrode configured to receive a second power voltage. The second node may be configured to receive the first power voltage.

In an embodiment, the initialization gate signal may have an active level in a first driving period, the writing gate signal may have an inactive level in the first driving period and the emission signal may have an inactive level in the first driving period.

In an embodiment, the initialization gate signal may have an inactive level in a second driving period subsequent to the first driving period, the writing gate signal may have an active level in the second driving period and the emission signal may have the inactive level in the second driving period.

In an embodiment, the initialization gate signal may have the inactive level in a third driving period subsequent to the second driving period, the writing gate signal may have the inactive level in the third driving period and the emission signal may have an active level in the third driving period.

In an embodiment, the initialization gate signal may have an active level in a first sensing period, the writing gate signal may have an inactive level in the first sensing period and the emission signal may have an inactive level in the first sensing period.

In an embodiment, the initialization gate signal may have an inactive level in a second sensing period subsequent to the first sensing period, the writing gate signal may have an active level in the second sensing period and the emission signal may have the inactive level in the second sensing period. Additionally, the sensing data voltage may be configured to gradually decrease from a maximum sensing data voltage in the second sensing period.

In an embodiment, it may be determined that the first switching element of the first pixel is turned on by sensing a voltage of the third node.

In an embodiment, when the voltage of the third node is substantially the same as the first power voltage, it may be determined that the first switching element is turned on.

In an embodiment, the display panel may further include a second pixel disposed adjacent to the first pixel, where the first pixel may be connected to a first sensing line and the second pixel may not be connected to the first sensing line. The data driver may be configured to output a first compensation data voltage of the first pixel and a second compensation data voltage of the second pixel based on the turned-on voltage of the first switching element of the first pixel.

In an embodiment, it may be determined that the first switching element of the first pixel is turned by sensing a current of the third node.

In an embodiment, the display panel may further include a second pixel disposed adjacent to the first pixel, where the first pixel and the second pixel may be commonly connected to a first sensing line. The memory may be configured to store the turned-on voltage based on a sensed signal received through the first sensing line.

In an embodiment, it may be determined that the first switching element of the first pixel is turned by sensing a luminance of the light emitting element.

In an embodiment, the first pixel may further include a fifth switching element including a control electrode configured to receive an anode initialization gate signal, a first electrode configured to receive the initialization voltage, and a second electrode connected to the fourth node.

In an embodiment, the anode initialization gate signal may be the writing gate signal.

In an embodiment, a method of driving a display apparatus includes outputting a sensing data voltage, which is gradually decreased, to a first pixel in a sensing mode, storing a turned-on voltage at a turned-on time point of a first switching element of the first pixel as the sensing data voltage gradually decreases in the sensing mode, generating a compensation data voltage of the first pixel based on the turned-on voltage in a driving mode and outputting the compensation data voltage to the first pixel in the driving mode.

In an embodiment, the first pixel may include the first switching element including a control electrode connected to a first node, a first electrode connected to a second node, and a second electrode connected to a third node, a second switching element including a control electrode configured to receive a writing gate signal, a first electrode configured to receive the grayscale data voltage and the sensing data voltage, and a second electrode connected to the first node, a third switching element including a control electrode configured to receive an emission signal, a first electrode connected to the third node, and a second electrode connected to a fourth node, a fourth switching element including a control electrode configured to receive an initialization gate signal, a first electrode connected to the first node, and a second electrode configured to receive an initialization voltage, a storage capacitor including a first electrode configured to receive a first power voltage, and a second electrode connected to the first node, and a light emitting element including a first electrode connected to the fourth node, and a second electrode configured to receive a second power voltage. The second node may be configured to receive the first power voltage.

In an embodiment, the initialization gate signal may have an active level in a first driving period, the writing gate signal may have an inactive level in the first driving period and the emission signal may have an inactive level in the first driving period. The initialization gate signal may have an inactive level in a second driving period subsequent to the first driving period, the writing gate signal may have an active level in the second driving period, the emission signal may have the inactive level in the second driving period, the initialization gate signal may have the inactive level in a third driving period subsequent to the second driving period, the writing gate signal may have the inactive level in the third driving period and the emission signal may have an active level in the third driving period.

In an embodiment, the initialization gate signal may have an active level in a first sensing period, the writing gate signal may have an inactive level in the first sensing period and the emission signal may have an inactive level in the first sensing period. The initialization gate signal may have an inactive level in a second sensing period subsequent to the first sensing period, the writing gate signal may have an active level in the second sensing period, the emission signal may have the inactive level in the second sensing period and the sensing data voltage may be configured to gradually decrease from a maximum sensing data voltage in the second sensing period.

In an embodiment, it may be determined that the first switching element of the first pixel is turned on by sensing a voltage of the third node. When the voltage of the third node is substantially the same as the first power voltage, it may be determined that the first switching element is turned on.

In an embodiment, the electronic apparatus includes a display panel, a data driver, a driving controller, a processor and a memory where the display panel includes a first pixel. The data driver is configured to output a grayscale data voltage corresponding to input image data to the first pixel in a driving mode and output a sensing data voltage, which is being gradually decreased, to the first pixel in a sensing mode. The driving controller controls the data driver. The processor outputs the input image data and an input control signal to the driving controller. The memory is configured to store a turned-on voltage at a turned-on time point of a first switching element of the first pixel as the sensing data voltage gradually decreases in the sensing mode.

In an embodiment, the first pixel may include the first switching element including a control electrode connected to a first node, a first electrode connected to a second node and a second electrode connected to a third node, a second switching element including a control electrode configured to receive a writing gate signal, a first electrode configured to receive the grayscale data voltage and the sensing data voltage, and a second electrode connected to the first node, a third switching element including a control electrode configured to receive an emission signal, a first electrode connected to the third node, and a second electrode connected to a fourth node, a fourth switching element including a control electrode configured to receive an initialization gate signal, a first electrode connected to the first node, and a second electrode configured to receive an initialization voltage, a storage capacitor including a first electrode configured to receive a first power voltage and a second electrode connected to the first node, and a light emitting element including a first electrode connected to the fourth node and a second electrode configured to receive a second power voltage. The second node may be configured to receive the first power voltage.

According to an embodiment, the threshold voltage of the driving switching element may be compensated by sensing whether the driving switching element is turned on while gradually decreasing the sensing data voltage in the sensing mode.

In an embodiment, the pixel does not include a compensation transistor for compensating the threshold voltage of the driving switching element so that a structure of the pixel may be simplified, and accordingly, the display apparatus may support a high resolution.

BRIEF DESCRIPTION OF THE DRAWINGS

The above and other features and advantages of the invention will become more apparent by describing in detailed embodiments thereof with reference to the accompanying drawings, in which.

DETAILED DESCRIPTION

Figure 1:
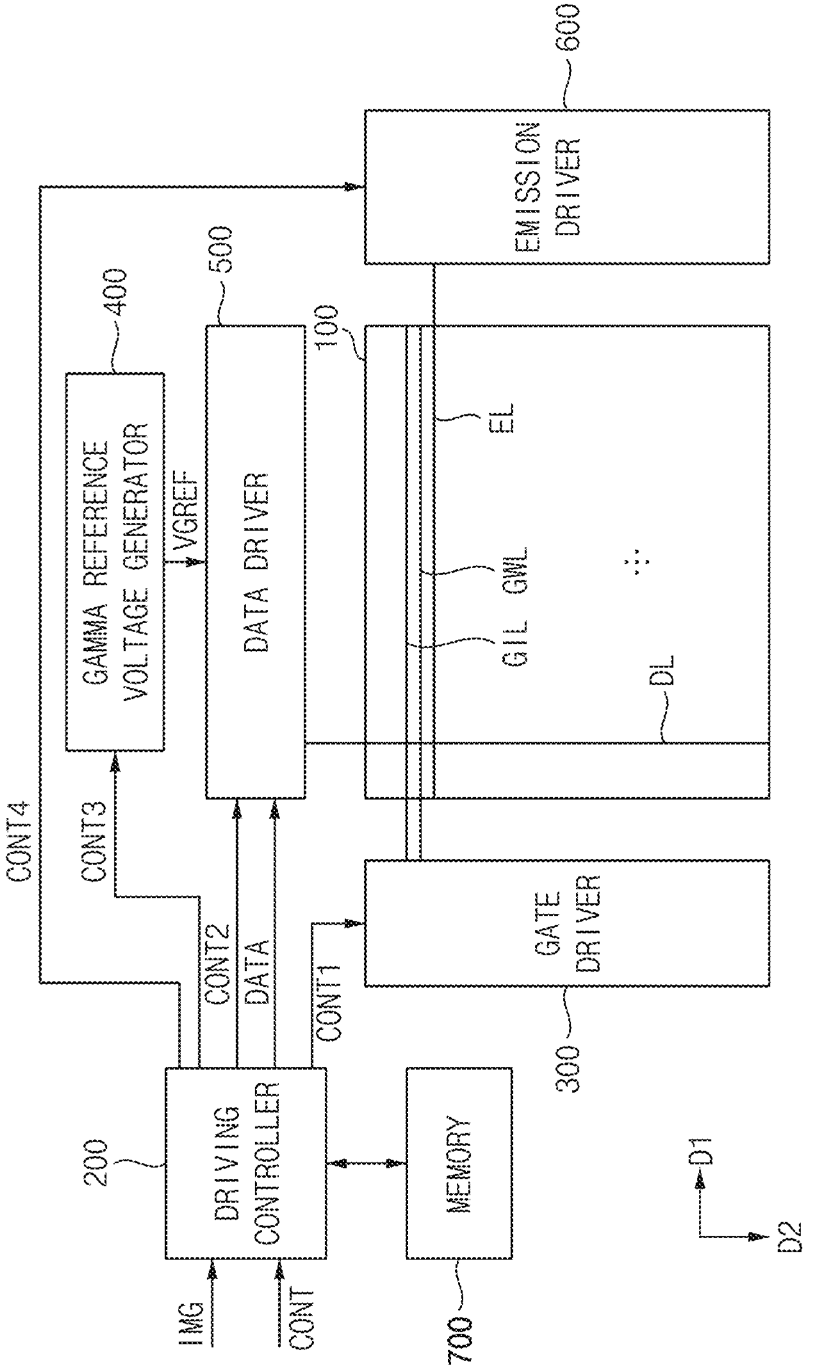
FIG. 1 is a block diagram illustrating a display apparatus, according to an embodiment.

Hereinafter, the present inventive concept will be explained in detail with reference to the accompanying drawings.

It will be understood that when an element (or a region, a layer, a portion, or the like) is referred to as being related to another such as being "on", "connected to" or "coupled to" another element, it may be directly disposed on, connected or coupled to the other element, or intervening elements may be disposed therebetween.

Like reference numerals or symbols refer to like elements throughout. In the drawings, the thickness, the ratio, and the size of the element are exaggerated for effective description of the technical contents. As used herein, the term "and/or" includes any and all combinations of one or more of the associated listed items.

The term "and/or," may include all combinations of one or more of which associated configurations may define.

It will also be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the scope of the inventive concept. Similarly, a second element, component, region, layer or section may be termed a first element, component, region, layer or section. As used herein, the singular forms, "a", "an" and "the" are intended to include the plural forms as well, unless the context clearly indicates otherwise.

Also, terms of "below", "on lower side", "above", "on upper side", or the like may be used to describe the relationships of the elements illustrated in the drawings. These terms have relative concepts and are described on the basis of the directions indicated in the drawings.

It will be further understood that the terms "comprise", "includes" and/or "have", when used in this specification, specify the presence of stated features, integers, steps, operations, elements, components, and/or groups thereof, but do not preclude the presence or addition of one or more other features, integers, steps, operations, elements, components, and/or groups thereof. As used herein, being "disposed directly on" may mean that there is no additional layer, film, region, plate, or the like between a part and another part such as a layer, a film, a region, a plate, or the like. For example, being "disposed directly on" may mean that two layers or two members are disposed without using an additional member such as an adhesive member, therebetween.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a display apparatus, according to an embodiment.

In an embodiment and referring to FIG. 1, the display apparatus includes a display panel 100 and a display panel driver, where the display panel driver includes a driving controller 200, a gate driver 300, a gamma reference voltage generator 400, a data driver 500 and an emission driver 600. The display panel driver furthers include a memory 700. In one embodiment, the memory 700 may be a nonvolatile memory. In another embodiment, the memory 700 may be a flash memory.

In an embodiment, the display panel 100 has a display region on which an image is displayed, and a peripheral region disposed adjacent to the display region.

The display panel 100 includes a plurality of gate lines GIL and GWL, a plurality of data lines DL, a plurality of emission lines EL and a plurality of pixels electrically connected to the gate lines GIL and GWL, the data lines DL and the emission lines EL. The gate lines GIL and GWL may extend in a first direction D1, the data lines DL may extend in a second direction D2 crossing the first direction D1 and the emission lines EL may extend in the first direction D1.

In an embodiment, the driving controller 200 receives input image data IMG and an input control signal CONT from an external apparatus. For example, the input image data IMG may include red image data, green image data and blue image data. The input image data IMG may also include white image data. The input image data IMG may also include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG and outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

In an embodiment, the gate driver 300 generates gate signals driving the gate lines GIL and GWL in response to the first control signal CONT1 received from the driving controller 200 and may output the gate signals to the gate lines GIL and GWL.

In an embodiment, the gamma reference voltage generator 400 generates a gamma reference voltage VGREF in response to the third control signal CONT3 received from the driving controller 200 and provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

In an embodiment, the data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF and outputs the data voltages to the data lines DL.

In an embodiment, the emission driver 600 generates emission signals to drive the emission lines EL in response to the fourth control signal CONT4 received from the driving controller 200 and may output the emission signals to the emission lines EL.

Although the gate driver 300 is disposed at a first side of the display panel 100 and the emission driver 600 is disposed at a second side of the display panel 100 opposite to the first side in FIG. 1 for convenience of explanation, the invention is not limited thereto. For example, in an embodiment, both of the gate driver 300 and the emission driver 600 may be disposed at the first side of the display panel 100. In another embodiment, both of the gate driver 300 and the emission driver 600 may be disposed at both sides (e.g. the first side and the second side) of the display panel 100. In still yet another embodiment, the gate driver 300 and the emission driver 600 may be integrally formed.

In an embodiment, the data driver 500 outputs a grayscale data voltage corresponding to the input image data IMG to the pixel of the display panel 100 in a driving mode. The data driver 500 outputs a sensing data voltage which is gradually deceased to the pixel of the display panel 100 in a sensing mode. The memory 700 stores a turned-on voltage at a turned-on time point of a first switching element of the pixel as the sensing data voltage gradually decreases in the sensing mode.

In an embodiment, the driving controller 200 may store the sensing data voltage applied to the pixel at the turned-on time point of the first switching element of the pixel to the memory 700.

The driving controller 200 may read information of the turned-on voltage from the memory 700 to compensate a threshold voltage of the pixel.

Figure 2:
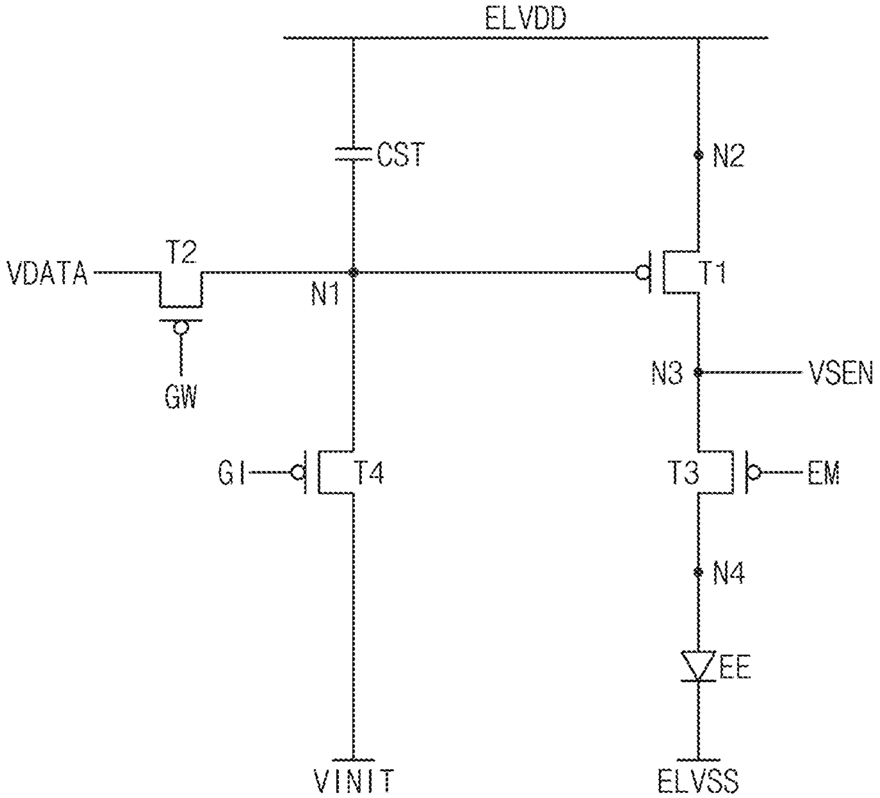
FIG. 2 is a circuit diagram illustrating a pixel of a display panel of FIG. 1, according to an embodiment.

FIG. 2 is a circuit diagram illustrating a pixel of a display panel 100 of FIG. 1, according to an embodiment.

In an embodiment and referring to FIGS. 1 and 2, the pixels receive a writing gate signal GW, an initialization gate signal GI, the data voltage VDATA and the emission signal EM, and a light emitting element EE of the pixel emits light corresponding to the level of the data voltage VDATA to display the image.

In an embodiment, the pixel may include the first switching element T1 including a control electrode connected to a first node N1, a first electrode connected to a second node N2 and a second electrode connected to a third node N3, a second switching element T2 including a control electrode receiving the writing gate signal GW, a first electrode receiving the grayscale data voltage and the sensing data voltage and a second electrode connected to the first node N1, a third switching element T3 including a control electrode receiving the emission signal EM, a first electrode connected to the third node N3 and a second electrode connected to a fourth node N4, a fourth switching element T4 including a control electrode receiving the initialization gate signal GI, a first electrode connected to the first node N1 and a second electrode receiving an initialization voltage VINIT, a storage capacitor CST including a first electrode receiving a first power voltage ELVDD and a second electrode connected to the first node N1 and the light emitting element EE including a first electrode connected to the fourth node N4 and a second electrode receiving a second power voltage ELVSS. The second node N2 may receive the first power voltage ELVDD.

In an embodiment, the first switching element T1 may be a driving switching element, the second switching element T2 may be a data writing switching element, the third switching element T3 may be a light emitting control switching element and the fourth switching element T4 may be an initialization switching element.

In an embodiment, the first power voltage ELVDD may be a high power voltage for emitting the light emitting element EE and the second power voltage ELVSS may be a low power voltage for emitting the light emitting element EE, where the first power voltage ELVDD may be higher than the second power voltage ELVSS.

In an embodiment, the first switching element T1, the second switching element T2, the third switching element T3 and the fourth switching element T4 may be P-type transistors. For example, the first switching element T1, the second switching element T2, the third switching element T3 and the fourth switching element T4 may be low temperature polysilicon (LTPS) thin film transistors.

Figure 3:
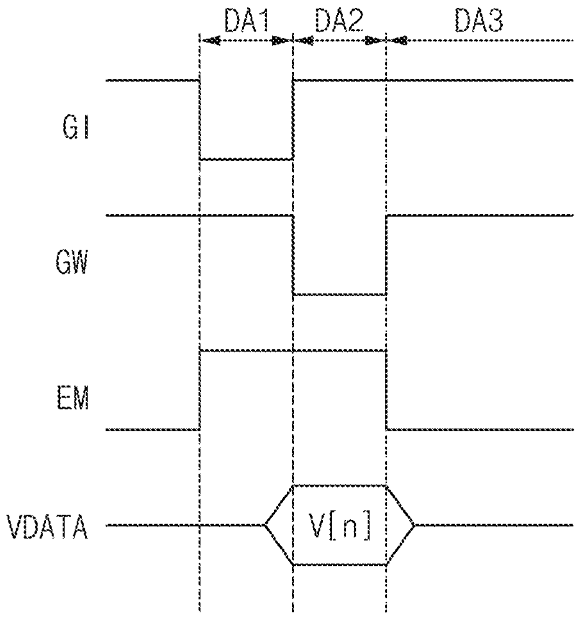
FIG. 3 is a timing diagram illustrating an example of input signals applied to the pixel of FIG. 2 in a driving mode, according to an embodiment.
Figure 4:
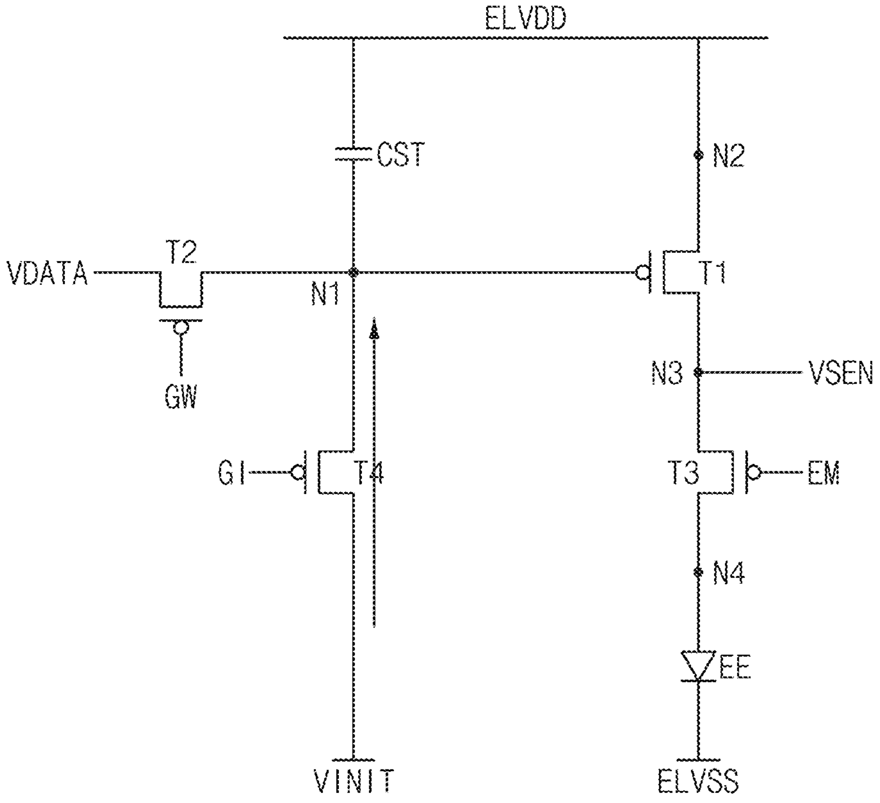
FIG. 4 is a circuit diagram illustrating an operation of the pixel of FIG. 2 in a first driving period, according to an embodiment.
Figure 5:
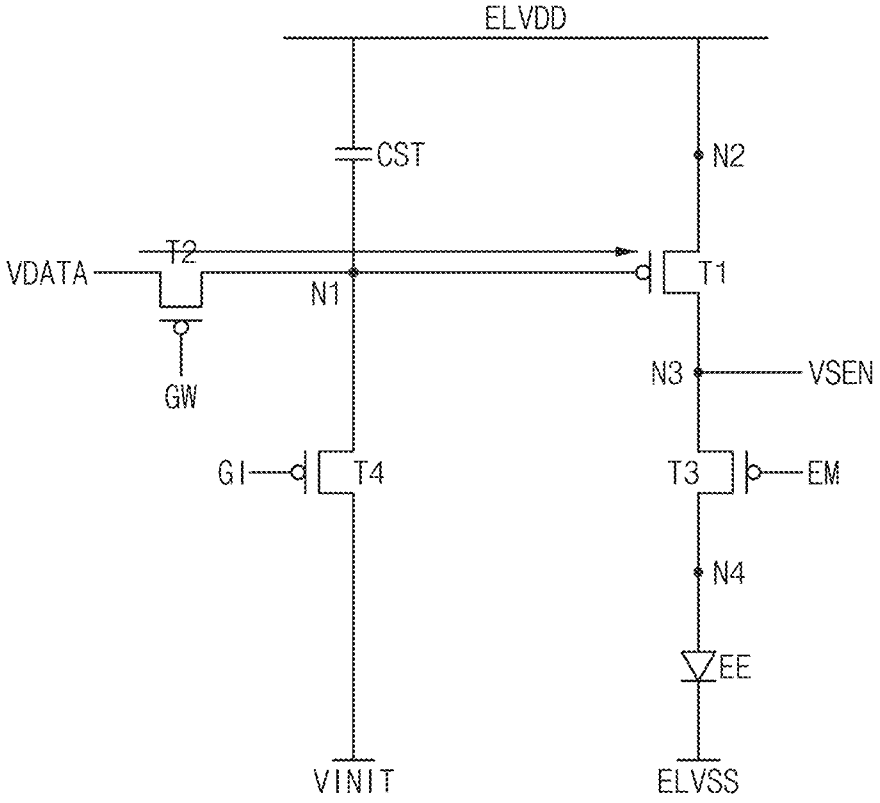
FIG. 5 is a circuit diagram illustrating an operation of the pixel of FIG. 2 in a second driving period, according to an embodiment.
Figure 6:
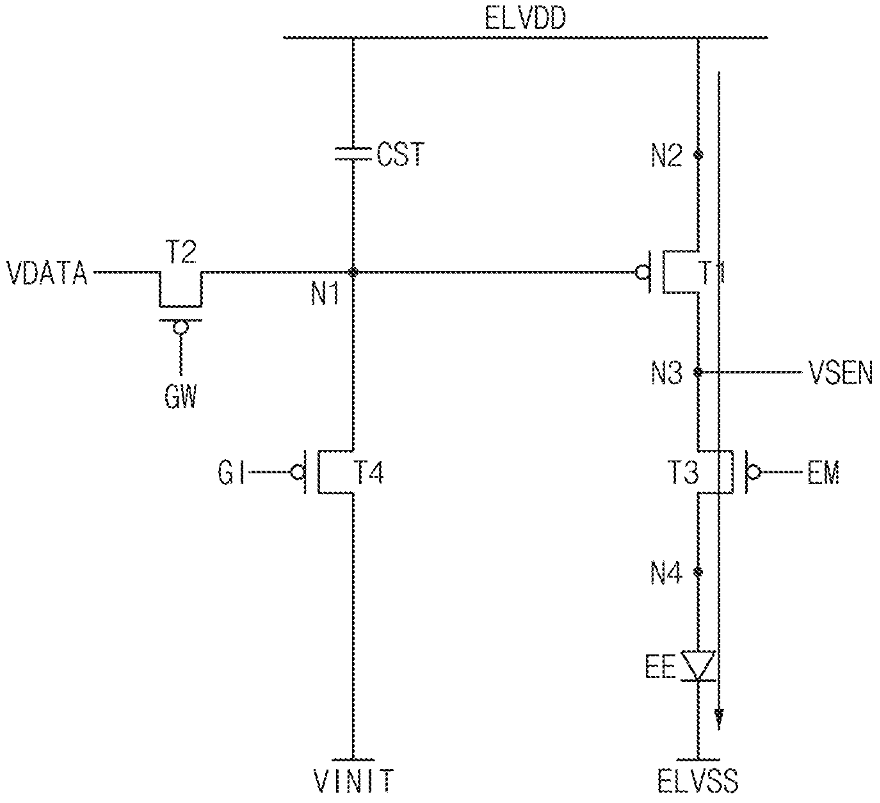
FIG. 6 is a circuit diagram illustrating an operation of the pixel of FIG. 2 in a third driving period, according to an embodiment.

FIG. 3 is a timing diagram illustrating an example of input signals applied to the pixel of FIG. 2 in a driving mode, according to an embodiment. FIG. 4 is a circuit diagram illustrating an operation of the pixel of FIG. 2 in a first driving period DA1, according to an embodiment. FIG. 5 is a circuit diagram illustrating an operation of the pixel of FIG. 2 in a second driving period DA2, according to an embodiment. FIG. 6 is a circuit diagram illustrating an operation of the pixel of FIG. 2 in a third driving period DA3, according to an embodiment.

In an embodiment, in the first driving period DA1, the initialization gate signal GI may have an active level, the writing gate signal GW may have an inactive level and the emission signal EM may have an inactive level.

When the switching elements receiving the signals are P-type transistors, an active level of each of the signal may be a low level and an inactive level of each of the signal may be a high level. In contrast, when the switching elements receiving the signals are N-type transistors, the active level may be a high level and the inactive level may be a low level.

In an embodiment and as shown in FIG. 4, in the first driving period DA1, the fourth switching element T4 may be turned on by the initialization gate signal GI having the active level so that the initialization voltage VINIT may be applied to the first node N1.

In the second driving period DA2 subsequent to the first driving period DA1, the initialization gate signal GI may have an inactive level, the writing gate signal GW may have an active level and the emission signal EM may have the inactive level.

In an embodiment and as shown in FIG. 5, in the second driving period DA2, the second switching element T2 may be turned on by the writing gate signal GW having the active level so that the grayscale data voltage V[n] may be applied to the first node N1.

In the third driving period DA3 subsequent to the second driving period DA2, the initialization gate signal GI may have the inactive level, the writing gate signal GW may have the inactive level and the emission signal EM may have the active level.

In an embodiment and as shown in FIG. 6, in the third driving period DA3, the third switching element T3 may be turned on by the emission signal EM having the active level and the first switching element T1 may be turned on by the grayscale data voltage V[n] so that a driving current may flow through the light emitting element EE along the first switching element T1 and the third switching element T3.

Figure 7:
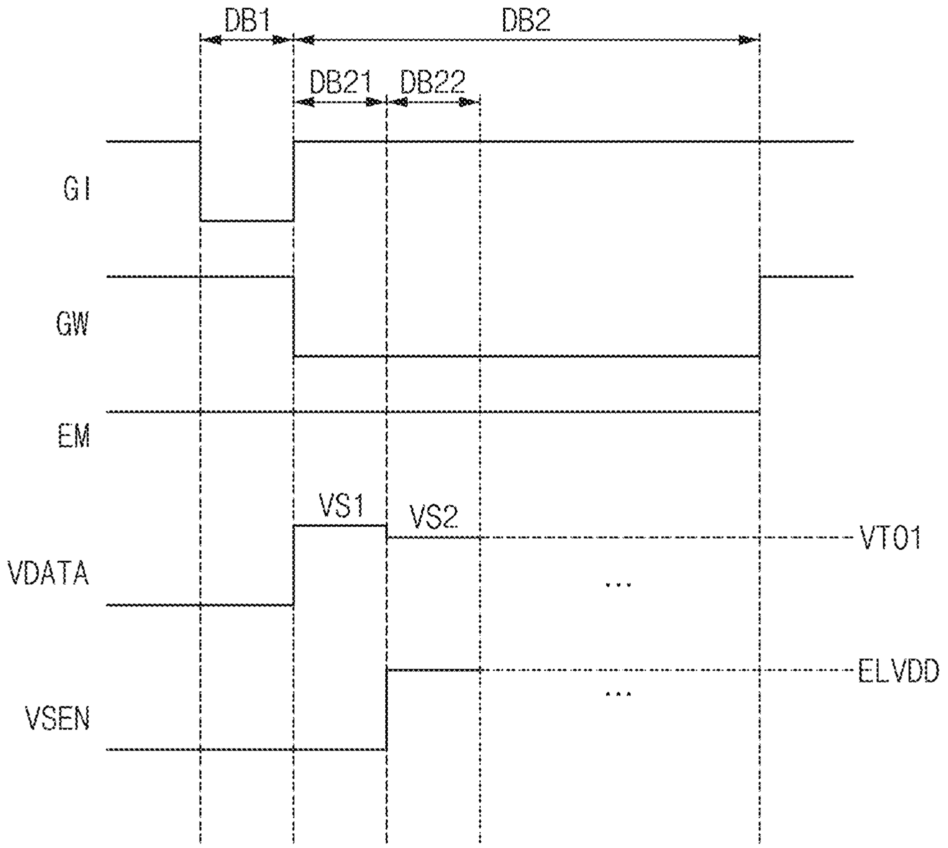
FIG. 7 is a timing diagram illustrating an example of input signals applied to the pixel of FIG. 2 and a sensed signal of the pixel of FIG. 2 in a sensing mode, according to an embodiment.
Figure 8:
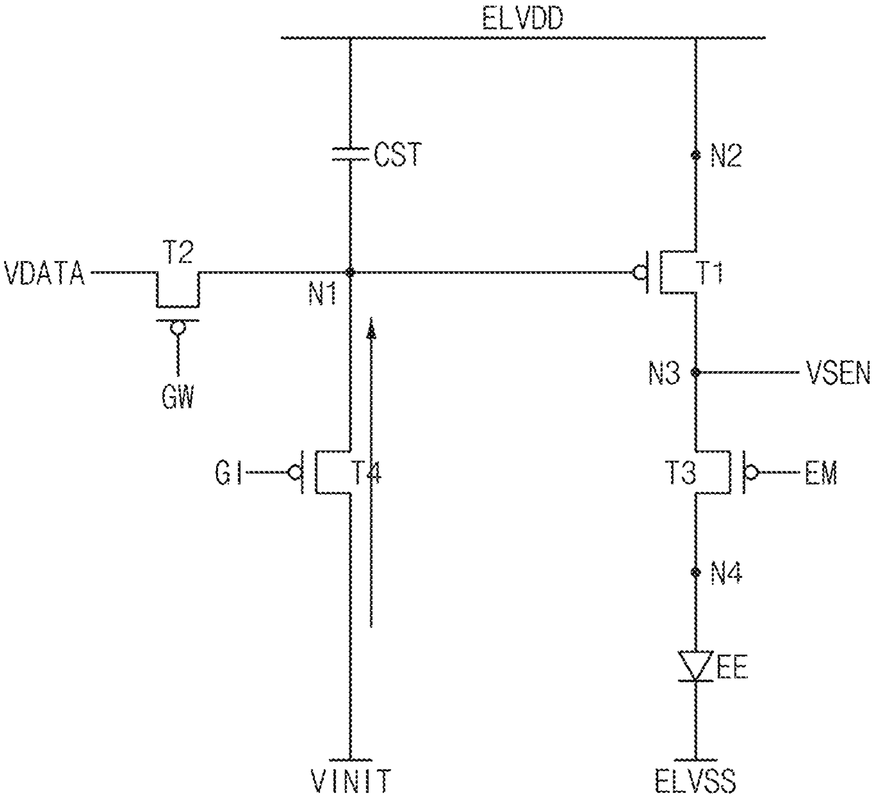
FIG. 8 is a circuit diagram illustrating an operation of the pixel of FIG. 2 in a first sensing period, according to an embodiment.
Figure 9:
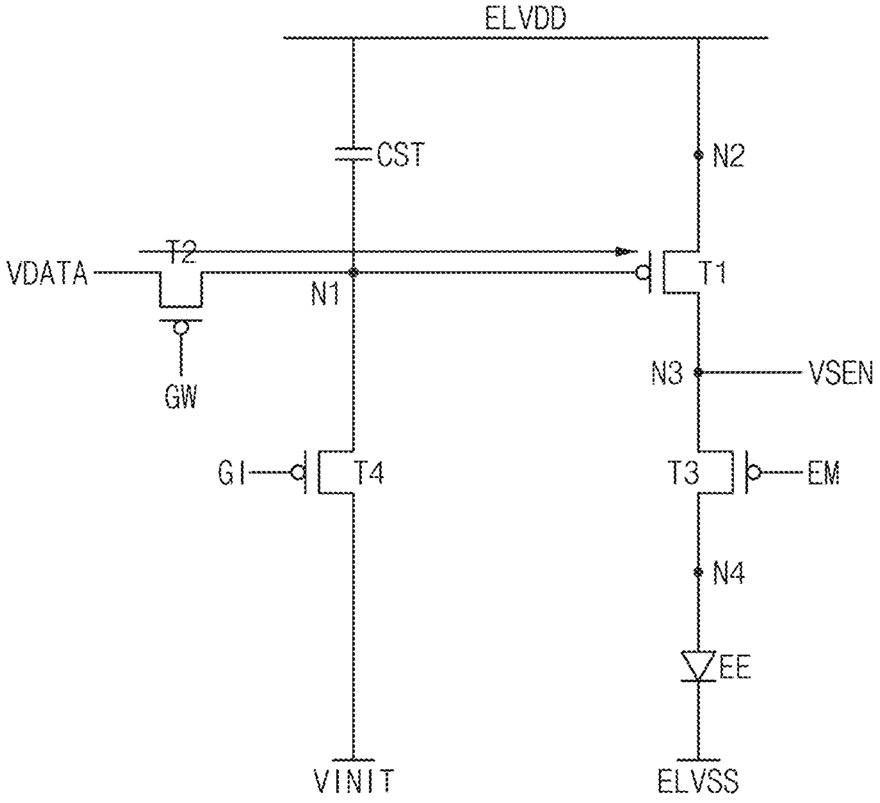
FIG. 9 is a circuit diagram illustrating an operation of the pixel of FIG. 2 in a 2-1 sensing period, according to an embodiment.
Figure 10:
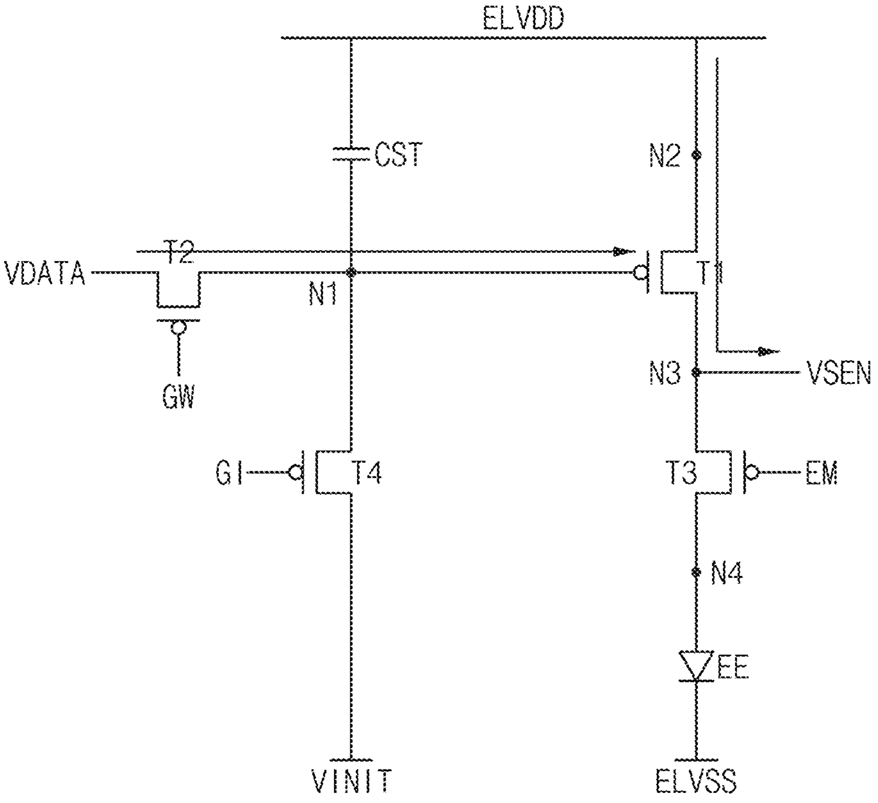
FIG. 10 is a circuit diagram illustrating an operation of the pixel of FIG. 2 in a 2-2 sensing period, according to an embodiment.

FIG. 7 is a timing diagram illustrating an example of input signals applied to the pixel of FIG. 2 and a sensed signal of the pixel of FIG. 2 in a sensing mode, according to an embodiment. FIG. 8 is a circuit diagram illustrating an operation of the pixel of FIG. 2 in a first sensing period DB1, according to an embodiment. FIG. 9 is a circuit diagram illustrating an operation of the pixel of FIG. 2 in a 2-1 sensing period DB21, according to an embodiment. FIG. 10 is a circuit diagram illustrating an operation of the pixel of FIG. 2 in a 2-2 sensing period DB22, according to an embodiment.

In an embodiment and referring to FIGS. 1 to 10, in the first sensing period DB1, the initialization gate signal GI may have the active level, the writing gate signal GW may have an inactive level and the emission signal EM may have an inactive level.

As shown in FIG. 8, in the sensing period DB1, the fourth switching element T4 may be turned on by the initialization gate signal GI having the active level so that the initialization voltage VINIT may be applied to the first node N1.

In a second sensing period DB2 subsequent to the first sensing period DB1, the initialization gate signal GI may have an inactive level, the writing gate signal GW may have an active level, the emission signal EM may have the inactive level and the sensing data voltage VS1 and VS2 may gradually decrease from a maximum sensing data voltage VS1.

In the 2-1 sensing period DB21, the initialization gate signal GI may have the inactive level, the writing gate signal GW may have the active level, the emission signal EM may have the inactive level and the sensing data voltage VS1 may have the maximum sensing data voltage VS1.

As shown in FIGS. 7 and 9, in the 2-1 sensing period DB21, the second switching element T2 may be turned on by the writing gate signal GW having the active level so that the first sensing data voltage VS1 may be applied to the first node N1.

In an embodiment, whether the first switching element T1 is turned on may be determined by sensing a voltage VSEN of the third node N3. For example, when the voltage VSEN of the third node N3 is substantially the same as the first power voltage ELVDD, it is determined that the first switching element T1 is turned on.

For example, when the first switching element T1 is turned on, a potential of the third node N3 is substantially the same as a potential of the first electrode of the light emitting element EE. An internal resistance of the first switching element T1 may be negligible. A potential difference between an internal capacitor of the light emitting element EE and the second power voltage ELVSS may be refreshed in a unit of a frame. Thus, when the first switching element T1 is turned off, a level of the third node N3 may be floated or may be an unknown level. However, as the first switching element T1 starts to be turned on, the second node N2 and the third node N3 are connected so that the level of the third node N3 may be a level of the first power voltage ELVDD.

In an embodiment, the sensing data voltages at turned-on time points of the first switching elements T1 of the pixels are varied for the pixels. The sensing data voltage at the turned-on time point of the first switching element T1 of the pixel may be referred to as a turned-on data voltage or the turned-on voltage of the first switching element T1. The sensing data voltage at the turned-on time point of the first switching element T1 of the pixel may be the threshold voltage of the first switching element T1.

In FIG. 9, it is assumed that the first switching element T1 is not turned on yet.

In an embodiment and as shown in FIGS. 7 and 10, in the 2-2 sensing period DB22, the second switching element T2 may be turned on by the writing gate signal GW having the active level so that the second sensing data voltage VS2 lower than the first sensing data voltage VS1 may be applied to the first node N1.

In FIG. 10, it is assumed that the first switching element T1 is turned on. For example, the second sensing data voltage VS2 may be a turned-on data voltage VTO1 of the first switching element T1 or the threshold voltage of the first switching element T1.

In an embodiment, when the first power voltage ELVDD is sensed at the third node N3, the sensing data voltage VTO1 (e.g. VS2) at that time point may be stored in the memory 700.

In this way, the threshold voltage of the first switching element T1 of the pixel may be stored in the memory 700 in the sensing mode. A compensation data voltage may be generated using the threshold voltage stored in the memory 700 and the compensation data voltage may be outputted to the pixel of the display panel 100 in the driving mode.

Figure 11:
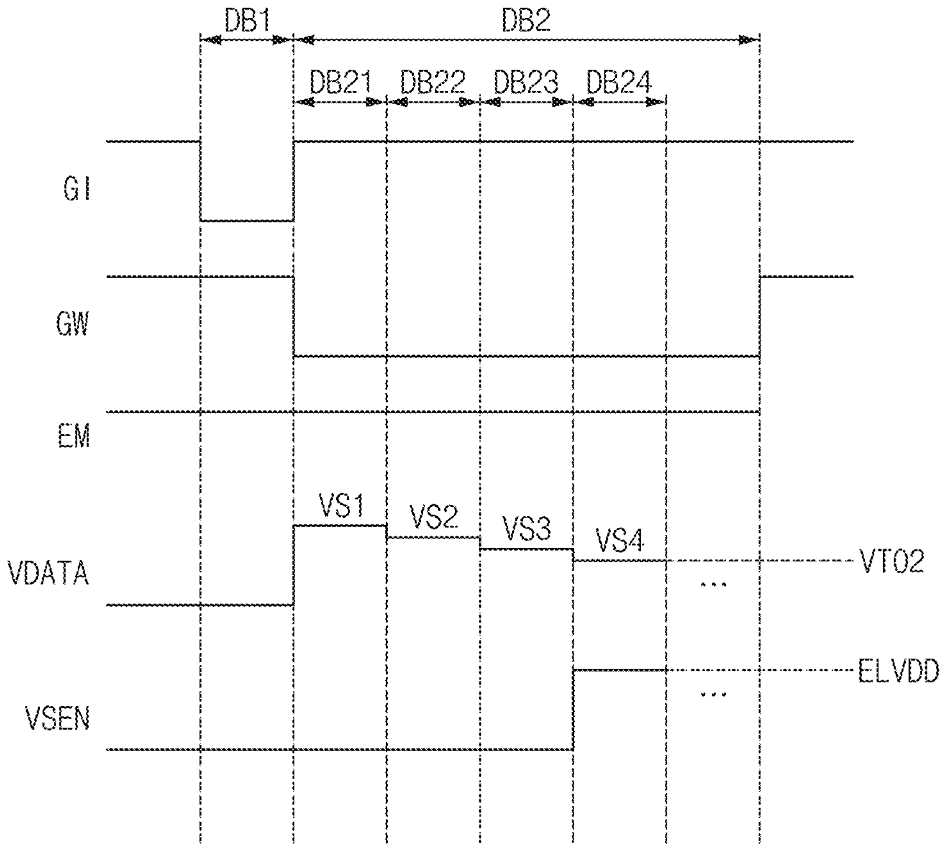
FIG. 11 is a timing diagram illustrating an example of input signals applied to the pixel of FIG. 2 and a sensed signal of the pixel of FIG. 2 in a sensing mode, according to an embodiment.

FIG. 11 is a timing diagram illustrating an example of input signals applied to the pixel of FIG. 2 and a sensed signal of the pixel of FIG. 2 in the sensing mode, according to an embodiment.

In an embodiment, the threshold voltage of the first switching element T1 may be VS2 in FIG. 7 and the threshold voltage of the first switching element T1 may be VS4 in FIG. 11.

In an embodiment and referring to FIG. 11, in a second sensing period DB2 subsequent to the first sensing period DB1, the initialization gate signal GI may have an inactive level, the writing gate signal GW may have an active level, the emission signal EM may have the inactive level and the sensing data voltage VS1, VS2, VS3 and VS4 may gradually decrease from a maximum sensing data voltage VS1.

In a 2-1 sensing period DB21, the initialization gate signal GI may have the inactive level, the writing gate signal GW may have the active level, the emission signal EM may have the inactive level and the sensing data voltage VS1 may have the maximum sensing data voltage VS1.

In the 2-1 sensing period DB21, the second switching element T2 may be turned on by the writing gate signal GW having the active level so that the first sensing data voltage VS1 may be applied to the first node N1.

For example, in the 2-1 sensing period DB21 of FIG. 11, the first switching element T1 may not be turned on yet.

In a 2-2 sensing period DB22, the second switching element T2 may be turned on by the writing gate signal GW having the active level so that the second sensing data voltage VS2 which is lower than the first sensing data voltage VS1 may be applied to the first node N1.

For example, in the 2-2 sensing period DB22 of FIG. 11, the first switching element T1 may not be turned on yet.

In a 2-3 sensing period DB23, the second switching element T2 may be turned on by the writing gate signal GW having the active level so that the third sensing data voltage VS3 which is lower than the second sensing data voltage VS2 may be applied to the first node N1.

For example, in the 2-3 sensing period DB23 of FIG. 11, the first switching element T1 may not be turned on yet.

In a 2-4 sensing period DB24, the second switching element T2 may be turned on by the writing gate signal GW having the active level so that the fourth sensing data voltage VS4 which is lower than the third sensing data voltage VS3 may be applied to the first node N1.

For example, in the 2-4 sensing period DB24 of FIG. 11, the first switching element T1 may be turned on. For example, the fourth sensing data voltage VS4 may be a turned-on data voltage VTO2 of the first switching element T1 or the threshold voltage of the first switching element T1.

When the first power voltage ELVDD is sensed at the third node N3, the sensing data voltage VTO2 (e.g. VS4) at that time point may be stored in the memory 700.

In this way, the threshold voltage of the first switching element T1 of the pixel may be stored in the memory 700 in the sensing mode. A compensation data voltage may be generated using the threshold voltage stored in the memory 700 and the compensation data voltage may be outputted to the pixel of the display panel 100 in the driving mode.

In an embodiment, the sensing mode may operate in a manufacturing stage of the display apparatus. In the manufacturing stage of the display apparatus, the threshold voltages of the first switching elements T1 of the pixels of the display panel 100 may be sensed and stored in the memory 700.

In an embodiment, after the display apparatus is driven, the driving controller 200 and the data driver 500 may generate the compensation data voltages in which the threshold voltages of the first switching elements T1 are compensated to compensate threshold voltage variations of the first switching elements T1 of the pixels.

Although the sensing mode is exemplified to be operated at the manufacturing stage of the display apparatus, the present invention is not limited thereto. The sensing mode may be operated at any time when it is necessary to compensate the threshold voltages of the first switching elements T1. For example, in an embodiment, when the display apparatus is turned off, the sensing mode may be operated to update threshold voltage information of the first switching elements T1 stored in the memory 700.

Figure 12:
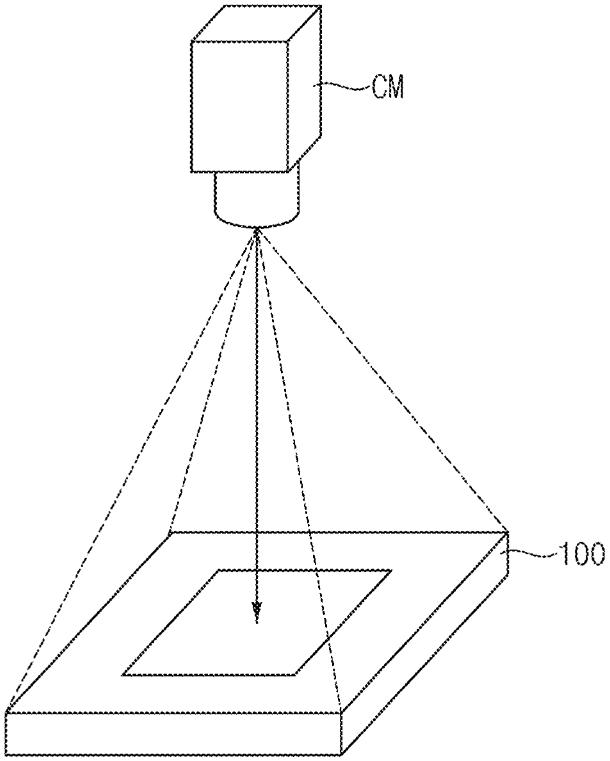
FIG. 12 is a diagram illustrating a compensation operation of the display panel of FIG. 1, according to an embodiment.

FIG. 12 is a diagram illustrating a compensation operation of the display panel 100 of FIG. 1, according to an embodiment.

In an embodiment and referring to FIGS. 1 to 12, a test image is displayed on the display panel 100 and the display panel 100 is captured by a camera CM so that a uniformity of the display panel 100 may be compensated.

Prior to the uniformity compensation operation of the display panel 100, the sensing mode is operated to store the threshold voltages of the first switching elements T1 of the pixels of the display panel 100 to the memory 700 in advance.

Subsequent to the threshold voltage compensation, the uniformity of the display panel 100 is compensated so that an accuracy of the uniformity compensation of the display panel 100 may be enhanced.

Figure 13:
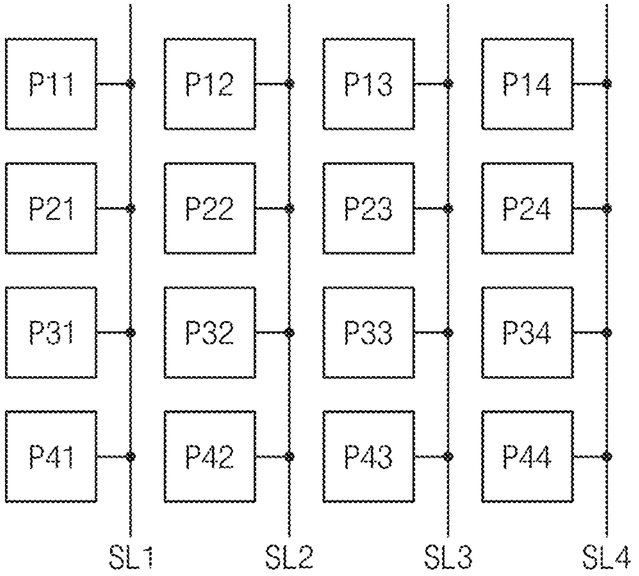
FIG. 13 is a diagram illustrating a connection between pixels and a sensing line of the display panel of FIG. 1, according to an embodiment.

FIG. 13 is a diagram illustrating a connection between pixels and a sensing line of the display panel 100 of FIG. 1, according to an embodiment.

In an embodiment and referring to FIGS. 1 to 13, for example, the display panel 100 may include a plurality of pixels disposed in a matrix form.

In an embodiment, the display panel 100 may include an 1-1 pixel P11, an 1-2 pixel P12, an 1-3 pixel P13 and an 1-4 pixel P14 disposed in a first row. The display panel 100 may include a 2-1 pixel P21, a 2-2 pixel P22, a 2-3 pixel P23 and a 2-4 pixel P24 disposed in a second row. The display panel 100 may include a 3-1 pixel P31, a 3-2 pixel P32, a 3-3 pixel P33 and a 3-4 pixel P34 disposed in a third row. The display panel 100 may include a 4-1 pixel P41, a 4-2 pixel P42, a 4-3 pixel P43 and a 4-4 pixel P44 disposed in a fourth row.

The 1-1 pixel P11, the 2-1 pixel P21, the 3-1 pixel P31 and the 4-1 pixel P41 may be connected to a first sensing line SL1. The 1-2 pixel P12, the 2-2 pixel P22, the 3-2 pixel P32 and the 4-2 pixel P42 may be connected to a second sensing line SL2. The 1-3 pixel P13, the 2-3 pixel P23, the 3-3 pixel P33 and the 4-3 pixel P43 may be connected to a third sensing line SL3. The 1-4 pixel P14, the 2-4 pixel P24, the 3-4 pixel P34 and the 4-4 pixel P44 may be connected to a fourth sensing line SL4.

In an embodiment, the voltage VSEN of the third node N3 may be sensed in a unit of a pixel. Thus, in an embodiment, the turned-on voltage of the first switching element T1 may be determined in a unit of a pixel.

In an embodiment, the display panel 100 may include the 1-1 pixel P11 and the 1-2 pixel P12 disposed adjacent to the 1-1 pixel P11, where the 1-1 pixel P11 may be connected to the first sensing line SL1 and the 1-2 pixel P12 may be connected to the second sensing line SL2.

In an embodiment, the data driver 500 may output a first compensation data voltage of the 1-1 pixel P11 based on the turned-on voltage of the first switching element T1 of the 1-1 pixel P11 and a second compensation data voltage of the 1-2 pixel P12 based on the turned-on voltage of the first switching element T1 of the 1-2 pixel P12. For example, in an embodiment, the turned-on voltage of the first switching element T1 may be determined in a unit of a pixel and the threshold voltage of the first switching element T1 may be compensated in a unit of a pixel.

According to an embodiment, the threshold voltage of the driving switching element T1 may be compensated for by sensing whether the driving switching element T1 is turned on while gradually decreasing the sensing data voltage in the sensing mode.

In an embodiment, the pixel does not include a compensation transistor for compensating the threshold voltage of the driving switching element T1 so that a structure of the pixel may be simplified, and accordingly, the display apparatus may support a high resolution.

Figure 14:
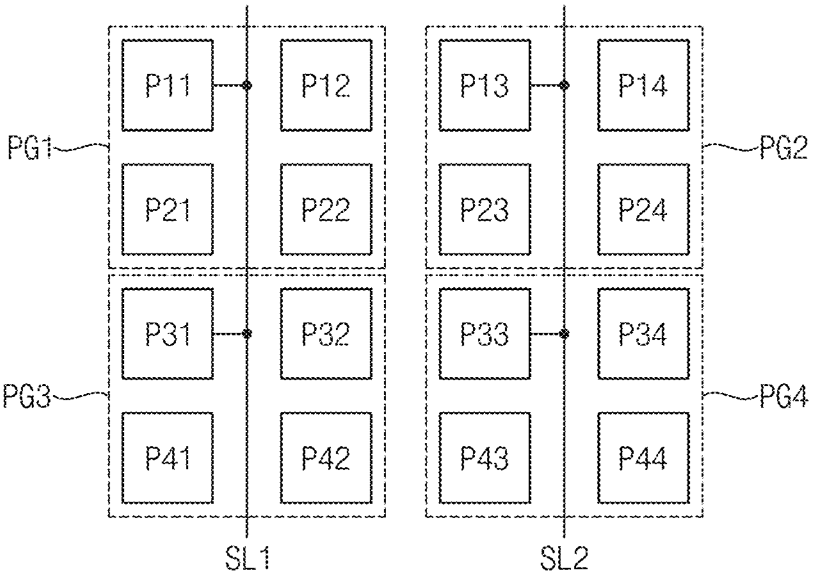
FIG. 14 is a diagram illustrating a connection between pixels and a sensing line of a display panel of a display apparatus, according to an embodiment.

FIG. 14 is a diagram illustrating a connection between pixels and a sensing line of a display panel 100 of a display apparatus, according to an embodiment.

The display apparatus, according to an embodiment, is substantially the same as the display apparatus of the previous embodiment explained referring to FIGS. 1 to 13 with the exception that the threshold voltage of the first switching element T1 is compensated for in a unit of a plurality of pixels. Thus, the same reference numerals will be used to refer to the same or like parts as those described in the previous embodiment of FIGS. 1 to 13 and any repetitive explanation concerning the above elements will be omitted.

In an embodiment and referring to FIGS. 1 to 12 and 14, for example, the display panel 100 may include a plurality of pixels disposed in a matrix form.

The display panel 100 may include an 1-1 pixel P11, an 1-2 pixel P12, an 1-3 pixel P13 and an 1-4 pixel P14 disposed in a first row. The display panel 100 may include a 2-1 pixel P21, a 2-2 pixel P22, a 2-3 pixel P23 and a 2-4 pixel P24 disposed in a second row. The display panel 100 may include a 3-1 pixel P31, a 3-2 pixel P32, a 3-3 pixel P33 and a 3-4 pixel P34 disposed in a third row. The display panel 100 may include a 4-1 pixel P41, a 4-2 pixel P42, a 4-3 pixel P43 and a 4-4 pixel P44 disposed in a fourth row.

In an embodiment, a first pixel group PG1 may include the 1-1 pixel P11, the 1-2 pixel P12, the 2-1 pixel P21 and the 2-2 pixel P22, a second pixel group PG2 may include the 1-3 pixel P13, the 1-4 pixel P14, the 2-3 pixel P23 and the 2-4 pixel P24, a third pixel group PG3 may include the 3-1 pixel P31, he 3-2 pixel P32, the 4-1 pixel P41 and the 4-2 pixel P42 and a fourth pixel group PG4 may include the 3-3 pixel P33, the 3-4 pixel P34, the 4-3 pixel P43 and the 4-4 pixel P44.

Although the single pixel group includes four pixels in FIG. 14, the invention is not limited thereto. For example, in an embodiment, the single pixel group may include two pixels.

In an embodiment, one of the pixels in the first pixel group PG1 may be connected to a first sensing line SL1, one of the pixels in the third pixel group PG3 may be connected to the first sensing line SL1, one of the pixels in the second pixel group PG2 may be connected to a second sensing line SL2 and one of the pixels in the fourth pixel group PG4 may be connected to the second sensing line SL2.

In an embodiment, the voltage VSEN of the third node N3 may be sensed in a unit of the pixel group. For example, only one voltage VSEN of the third node N3 may be sensed in the pixel group.

Thus, in an embodiment, the turned-on voltage of the first switching element T1 may be determined in a unit of the pixel group. For example, only one turned-on voltage of the first switching element T1 may be determined in the pixel group.

In an embodiment, the threshold voltages of the first switching elements T1 of all pixels in first pixel group may be compensated for using the turned-on voltage of the first switching element T1 as determined in one pixel in the first pixel group. Pixels disposed next to each other are subject to similar physical influences and are therefore likely to have similar threshold voltages. Accordingly, a space of the memory 700 may be reduced by storing only one threshold voltage for a plurality of pixels.

In an embodiment, the display panel 100 may include the 1-1 pixel P11 and the 1-2 pixel P12 disposed adjacent to the 1-1 pixel P11, where the 1-1 pixel P11 may be connected to the first sensing line SL1 and the 1-2 pixel P12 may not be connected to the first sensing line SL1. For example, the 1-2 pixel P12 may not be connected to any of sensing lines.

In an embodiment, the data driver 500 may output a first compensation data voltage of the 1-1 pixel P11 and a second compensation data voltage of the 1-2 pixel P12 based on the turned-on voltage of the first switching element T1 of the 1-1 pixel P11. For example, in an embodiment, the turned-on voltage of the first switching element T1 may be determined in a unit of a plurality of pixels and the threshold voltage of the first switching element T1 may be compensated in a unit of a plurality of pixels.

According to an embodiment, the threshold voltage of the driving switching element T1 may be compensated for by sensing whether the driving switching element T1 is turned on while gradually decreasing the sensing data voltage in the sensing mode.

In an embodiment, the pixel does not include a compensation transistor for compensating the threshold voltage of the driving switching element T1 so that a structure of the pixel may be simplified, and accordingly, the display apparatus may support a high resolution.

Figure 15:
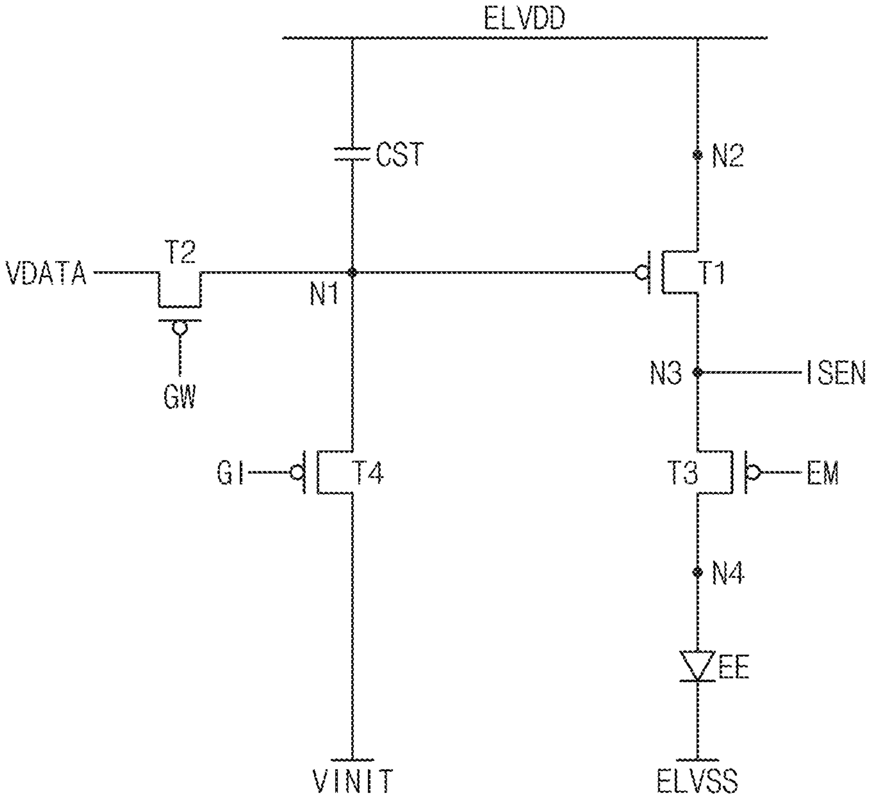
FIG. 15 is a circuit diagram illustrating a pixel of a display panel of a display apparatus, according to an embodiment.
Figure 16:
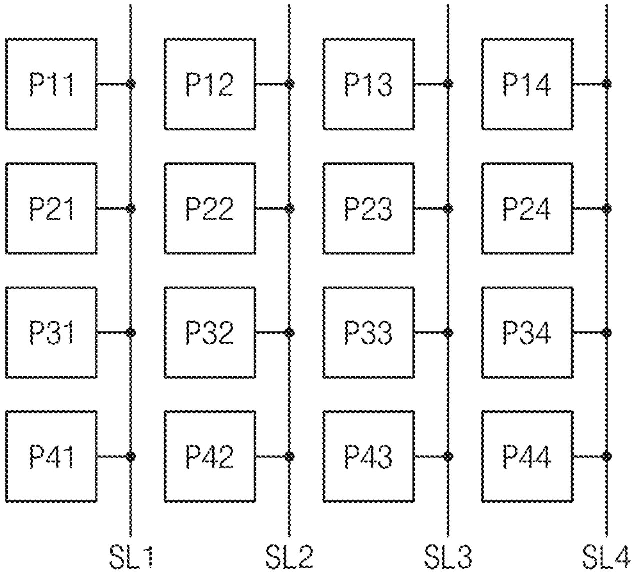
FIG. 16 is a diagram illustrating a connection between pixels and a sensing line of the display panel of FIG. 15, according to an embodiment.

FIG. 15 is a circuit diagram illustrating a pixel of a display panel 100 of a display apparatus, according to an embodiment. FIG. 16 is a diagram illustrating a connection between pixels and a sensing line of the display panel 100 of FIG. 15, according to an embodiment.

The display apparatus, according to an embodiment, is substantially the same as the display apparatus of the previous embodiment explained referring to FIGS. 1 to 13 with the exception that a current of the third node N3 is sensed to determine whether the first switching element T1 is turned on. Thus, the same reference numerals will be used to refer to the same or like parts as those described in the previous embodiment of FIGS. 1 to 13 and any repetitive explanation concerning the above elements will be omitted.

In an embodiment and referring to FIGS. 1, 3 to 12, 15 and 16, whether the first switching element T1 is turned on may be determined by sensing a current ISEN of the third node N3. For example, when the current ISEN of the third node N3 is equal to or greater than a predetermined threshold current, it is determined that the first switching element T1 is turned on.

In an embodiment, the sensing data voltages at turned-on time points of the first switching elements T1 of the pixels are varied for the pixels. The sensing data voltage at the turned-on time point of the first switching element T1 of the pixel may be referred to as a turned-on data voltage or the turned-on voltage of the first switching element T1. The sensing data voltage at the turned-on time point of the first switching element T1 of the pixel may be the threshold voltage of the first switching element T1.

When the current that is equal to or greater than the predetermined threshold current is sensed at the third node N3, the sensing data voltage VTO1 (e.g. VS2) at that time point may be stored in the memory 700.

In this way, the threshold voltage of the first switching element T1 of the pixel may be stored in the memory 700 in the sensing mode and a compensation data voltage may be generated using the threshold voltage stored in the memory 700 and the compensation data voltage may be outputted to the pixel of the display panel 100 in the driving mode.

For example, the display panel 100 may include a plurality of pixels disposed in a matrix form.

In an embodiment, the display panel 100 may include an 1-1 pixel P11, an 1-2 pixel P12, an 1-3 pixel P13 and an 1-4 pixel P14 disposed in a first row. The display panel 100 may include a 2-1 pixel P21, a 2-2 pixel P22, a 2-3 pixel P23 and a 2-4 pixel P24 disposed in a second row. The display panel 100 may include a 3-1 pixel P31, a 3-2 pixel P32, a 3-3 pixel P33 and a 3-4 pixel P34 disposed in a third row. The display panel 100 may include a 4-1 pixel P41, a 4-2 pixel P42, a 4-3 pixel P43 and a 4-4 pixel P44 disposed in a fourth row.

The 1-1 pixel P11, the 2-1 pixel P21, the 3-1 pixel P31 and the 4-1 pixel P41 may be connected to a first sensing line SL1, the 1-2 pixel P12, the 2-2 pixel P22, the 3-2 pixel P32 and the 4-2 pixel P42 may be connected to a second sensing line SL2, the 1-3 pixel P13, the 2-3 pixel P23, the 3-3 pixel P33, the 4-3 pixel P43 may be connected to a third sensing line SL3 and the 1-4 pixel P14, the 2-4 pixel P24, the 3-4 pixel P34 and the 4-4 pixel P44 may be connected to a fourth sensing line SL4.

In the present embodiment, the current ISEN of the third node N3 may be sensed in a unit of a pixel. Thus, in the present embodiment, the turned-on voltage of the first switching element T1 may be determined in a unit of a pixel.

In an embodiment, the display panel 100 may include the 1-1 pixel P11 and the 1-2 pixel P12 disposed adjacent to the 1-1 pixel P11, the 1-1 pixel P11 may be connected to the first sensing line SL1 and the 1-2 pixel P12 may be connected to the second sensing line SL2.

In an embodiment, the data driver 500 may output a first compensation data voltage of the 1-1 pixel P11 based on the turned-on voltage of the first switching element T1 of the 1-1 pixel P11 and a second compensation data voltage of the 1-2 pixel P12 based on the turned-on voltage of the first switching element T1 of the 1-2 pixel P12. For example, in an embodiment, the turned-on voltage of the first switching element T1 may be determined in a unit of a pixel and the threshold voltage of the first switching element T1 may be compensated in a unit of a pixel.

According to an embodiment, the threshold voltage of the driving switching element T1 may be compensated for by sensing whether the driving switching element T1 is turned on while gradually decreasing the sensing data voltage in the sensing mode.

In an embodiment, the pixel does not include a compensation transistor for compensating the threshold voltage of the driving switching element T1 so that a structure of the pixel may be simplified, and accordingly, the display apparatus may support a high resolution.

Figure 17:
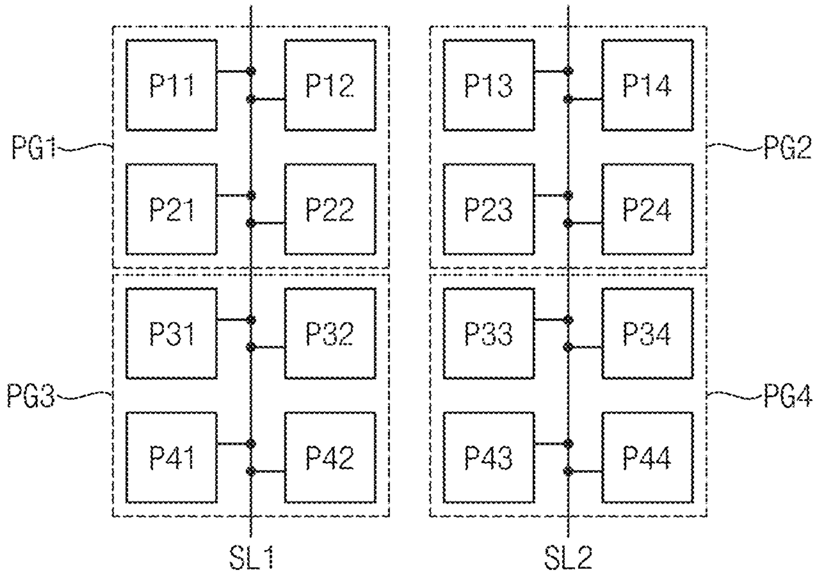
FIG. 17 is a diagram illustrating a connection between pixels and a sensing line of a display panel of a display apparatus, according to an embodiment.

FIG. 17 is a diagram illustrating a connection between pixels and a sensing line of a display panel 100 of a display apparatus, according to an embodiment.

The display apparatus, according to an embodiment, is substantially the same as the display apparatus of the previous embodiment explained referring to FIGS. 15 and 16 with the exception that the threshold voltage of the first switching element T1 is compensated for in a unit of a plurality of pixels. Thus, the same reference numerals will be used to refer to the same or like parts as those described in the previous embodiment of FIGS. 15 and 16 and any repetitive explanation concerning the above elements will be omitted.

In an embodiment and referring to FIGS. 1, 3 to 12, 15 and 17, for example, the display panel 100 may include a plurality of pixels disposed in a matrix form.

In an embodiment, the display panel 100 may include an 1-1 pixel P11, an 1-2 pixel P12, an 1-3 pixel P13 and an 1-4 pixel P14 disposed in a first row, a 2-1 pixel P21, a 2-2 pixel P22, a 2-3 pixel P23 and a 2-4 pixel P24 disposed in a second row, a 3-1 pixel P31, a 3-2 pixel P32, a 3-3 pixel P33 and a 3-4 pixel P34 disposed in a third row and a 4-1 pixel P41, a 4-2 pixel P42, a 4-3 pixel P43 and a 4-4 pixel P44 disposed in a fourth row.

In an embodiment, a first pixel group PG1 may include the 1-1 pixel P11, the 1-2 pixel P12, the 2-1 pixel P21 and the 2-2 pixel P22, a second pixel group PG2 may include the 1-3 pixel P13, the 1-4 pixel P14, the 2-3 pixel P23 and the 2-4 pixel P24, a third pixel group PG3 may include the 3-1 pixel P31, the 3-2 pixel P32, the 4-1 pixel P41 and the 4-2 pixel P42 and a fourth pixel group PG4 may include the 3-3 pixel P33, the 3-4 pixel P34, the 4-3 pixel P43 and the 4-4 pixel P44.

Although the single pixel group includes four pixels in FIG. 17, the invention is not limited thereto. For example, the single pixel group may include two pixels.

In an embodiment, all of the pixels in the first pixel group PG1 may be connected to a first sensing line SL1, all of the pixels in the third pixel group PG3 may be connected to the first sensing line SL1, all of the pixels in the second pixel group PG2 may be connected to a second sensing line SL2 and all of the pixels in the fourth pixel group PG4 may be connected to the second sensing line SL2.

In an embodiment, the current ISEN of the third node N3 may be sensed in a unit of the pixel group. For example, the current ISEN of the third node N3 of the pixel group may be sensed by summing the currents ISEN of the third nodes N3 of all of the pixels in the pixel group.

Thus, in an embodiment, the turned-on voltage of the first switching element T1 may be determined in a unit of the pixel group. For example, only one turned-on voltage of the first switching element T1 may be determined for the pixel group.

In an embodiment, the threshold voltages of the first switching elements T1 of all pixels in first pixel group may be compensated for using the turned-on voltage of the first switching element T1 as determined for the first pixel group. Pixels disposed next to each other are subject to similar physical influences and are therefore likely to have similar threshold voltages. Accordingly, a space of the memory 700 may be reduced by storing only one threshold voltage for a plurality of pixels.

In an embodiment, the display panel 100 may include the 1-1 pixel P11 and the 1-2 pixel P12 disposed adjacent to the 1-1 pixel P11 and the 1-1 pixel P11 and the 1-2 pixel P12 may be commonly connected to the first sensing line SL1.

Herein, in an embodiment, the memory 700 may store the turned-on voltage corresponding to the 1-1 pixel P11 and the 1-2 pixel P12 based on the sensed signal received through the first sensing line SL1.

According to an embodiment, the threshold voltage of the driving switching element T1 may be compensated for by sensing whether the driving switching element T1 is turned on while gradually decreasing the sensing data voltage in the sensing mode.

In an embodiment, the pixel does not include a compensation transistor for compensating the threshold voltage of the driving switching element T1 so that a structure of the pixel may be simplified, and accordingly, the display apparatus may support a high resolution.

Figure 18:
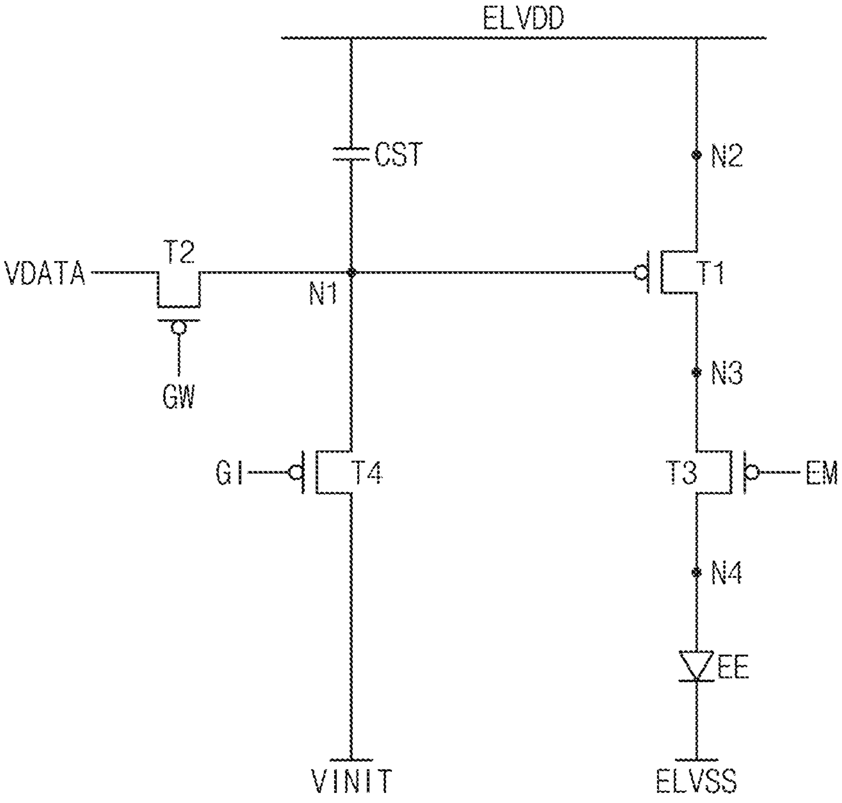
FIG. 18 is a circuit diagram illustrating a pixel of a display panel of a display apparatus, according to an embodiment.
Figure 19:
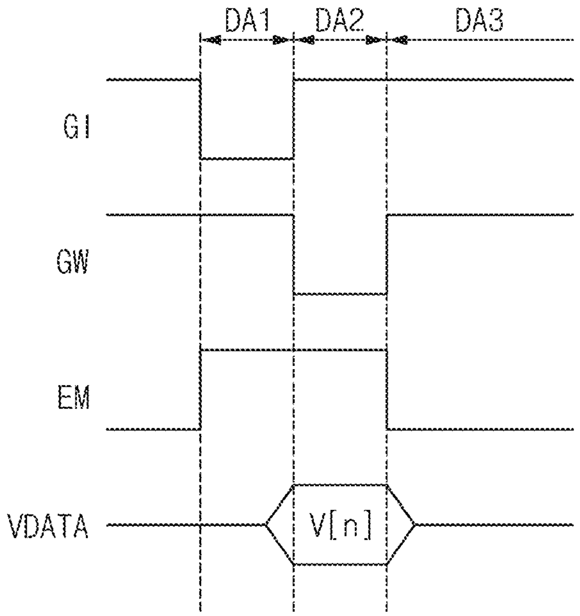
FIG. 19 is a timing diagram illustrating an example of input signals applied to the pixel of FIG. 18 in a driving mode, according to an embodiment.
Figure 20:
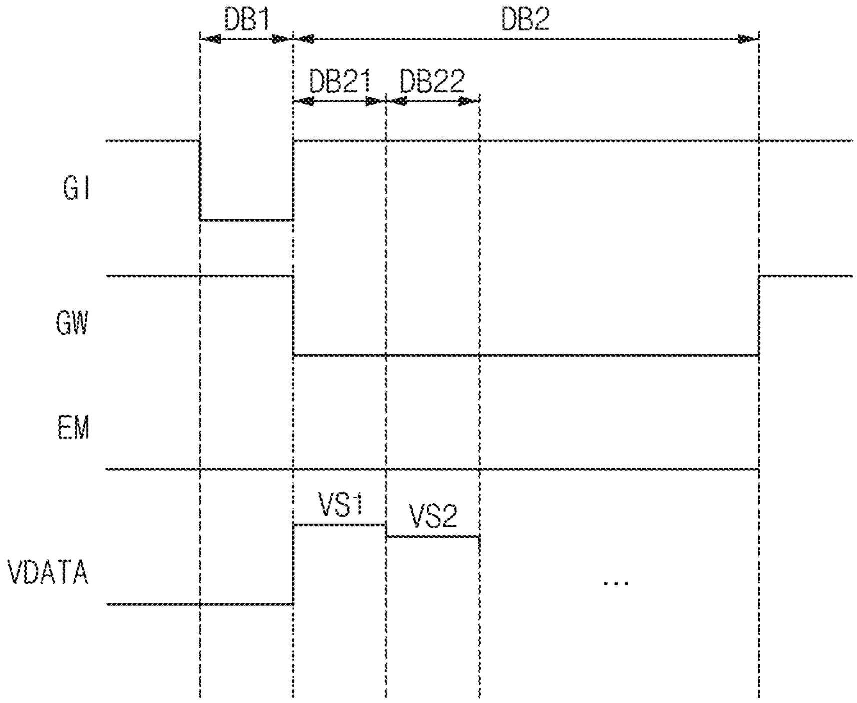
FIG. 20 is a timing diagram illustrating an example of input signals applied to the pixel of FIG. 18 and a sensed signal of the pixel of FIG. 18 in a sensing mode, according to an embodiment.

FIG. 18 is a circuit diagram illustrating a pixel of a display panel 100 of a display apparatus, according to an embodiment. FIG. 19 is a timing diagram illustrating an example of input signals applied to the pixel of FIG. 18 in a driving mode, according to an embodiment. FIG. 20 is a timing diagram illustrating an example of input signals applied to the pixel of FIG. 18 and a sensed signal of the pixel of FIG. 18 in a sensing mode, according to an embodiment.

The display apparatus, according to an embodiment, is substantially the same as the display apparatus of the previous embodiment explained referring to FIGS. 1 to 13 with the exception that a luminance of the light emitting element EE is sensed to determine whether the first switching element T1 is turned on. Thus, the same reference numerals will be used to refer to the same or like parts as those described in the previous embodiment of FIGS. 1 to 13 and any repetitive explanation concerning the above elements will be omitted.

In an embodiment and referring to FIGS. 1, 3 to 12 and 18 to 20, whether the first switching element T1 is turned on may be determined by sensing a luminance of the light emitting element EE. For example, when the luminance of the light emitting element EE is equal to or greater than a predetermined threshold luminance, it is determined that the first switching element T1 is turned on.

In an embodiment, the sensing data voltages at turned-on time points of the first switching elements T1 of the pixels are varied for the pixels. The sensing data voltage at the turned-on time point of the first switching element T1 of the pixel may be referred to as a turned-on data voltage or the turned-on voltage of the first switching element T1 and the sensing data voltage at the turned-on time point of the first switching element T1 of the pixel may be the threshold voltage of the first switching element T1.

In an embodiment, when a luminance that is equal to or greater than the predetermined threshold luminance is sensed at the light emitting element EE, the sensing data voltage VTO1 (e.g. VS2) at that time point may be stored in the memory 700.

In this way, the threshold voltage of the first switching element T1 of the pixel may be stored in the memory 700 in the sensing mode. A compensation data voltage may be generated using the threshold voltage stored in the memory 700 and the compensation data voltage may be outputted to the pixel of the display panel 100 in the driving mode.

In an embodiment, determining the threshold voltage of the first switching element T1 based on the luminance of the light emitting element EE may be operated in a unit of a pixel, in a unit of a pixel group or in a unit of a display block.

A timing diagram of FIG. 19 is substantially the same as the timing diagram of FIG. 3.

In an embodiment and referring to FIG. 19, in the first driving period DA1, the initialization gate signal GI may have an active level, the writing gate signal GW may have an inactive level and the emission signal EM may have an inactive level.

In the second driving period DA2 subsequent to the first driving period DA1, the initialization gate signal GI may have an inactive level, the writing gate signal GW may have an active level and the emission signal EM may have the inactive level.

In the third driving period DA3 subsequent to the second driving period DA2, the initialization gate signal GI may have the inactive level, the writing gate signal GW may have the inactive level and the emission signal EM may have the active level.

In an embodiment, a timing diagram of FIG. 20 is substantially the same as the timing diagram of FIG. 7 with the exception that the emission signal EM has an active level. In the sensing mode of FIG. 7 in which the voltage VSEN of the third node N3 is sensed, the light emitting element EE does not need to emit a light in the sensing mode of FIG. 7 so that the emission signal EM may have the inactive level during the sensing mode. In contrast, in the sensing mode of FIG. 20 in which the luminance of the light emitting element EE is sensed, the light emitting element EE needs to emit a light in the sensing mode of FIG. 20 so that the emission signal EM may have the active level during the sensing mode.

Figure 21:
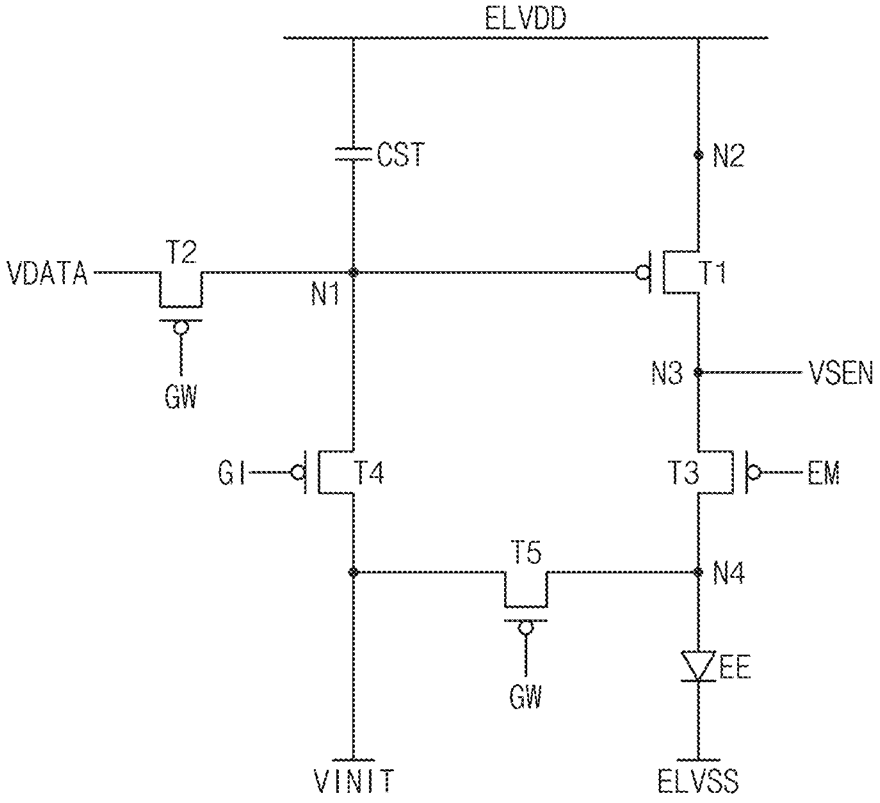
FIG. 21 is a circuit diagram illustrating a pixel of a display panel of a display apparatus, according to an embodiment.

FIG. 21 is a circuit diagram illustrating a pixel of a display panel of a display apparatus, according to an embodiment.

The display apparatus, according to an embodiment, is substantially the same as the display apparatus of the previous embodiment explained referring to FIGS. 1 to 13 with the exception that the pixel further includes a fifth switching element. Thus, the same reference numerals will be used to refer to the same or like parts as those described in the previous embodiment of FIGS. 1 to 13 and any repetitive explanation concerning the above elements will be omitted.

In an embodiment and referring to FIGS. 1, 3 to 13 and 21, the pixels receive a writing gate signal GW, an initialization gate signal GI, the data voltage VDATA and the emission signal EM and a light emitting element EE of the pixel emits light corresponding to the level of the data voltage VDATA to display the image.

The pixel may include the first switching element T1 including a control electrode connected to a first node N1, a first electrode connected to a second node N2 and a second electrode connected to a third node N3, a second switching element T2 including a control electrode receiving the writing gate signal GW, a first electrode receiving the grayscale data voltage and the sensing data voltage and a second electrode connected to the first node N1, a third switching element T3 including a control electrode receiving the emission signal EM, a first electrode connected to the third node N3 and a second electrode connected to a fourth node N4, a fourth switching element T4 including a control electrode receiving the initialization gate signal GI, a first electrode connected to the first node N1 and a second electrode receiving an initialization voltage VINIT, a storage capacitor CST including a first electrode receiving a first power voltage ELVDD and a second electrode connected to the first node N1 and the light emitting element EE including a first electrode connected to the fourth node N4 and a second electrode receiving a second power voltage ELVSS. The second node N2 may receive the first power voltage ELVDD.

In an embodiment, the pixel may further include a fifth switching element T5 including a control electrode receiving an anode initialization gate signal, a first electrode receiving the initialization voltage VINIT and a second electrode connected to the fourth node N4.

For example, the anode initialization gate signal may be the writing gate signal GW.

In an embodiment, the first switching element T1 may be a driving switching element, the second switching element T2 may be a data writing switching element, the third switching element T3 may be a light emitting control switching element, the fourth switching element T4 may be an initialization switching element and the fifth switching element T5 may be an anode initialization switching element.

According to an embodiment, the threshold voltage of the driving switching element T1 may be compensated by sensing whether the driving switching element T1 is turned on while gradually decreasing the sensing data voltage in the sensing mode.

In an embodiment, the pixel does not include a compensation transistor for compensating the threshold voltage of the driving switching element T1 so that a structure of the pixel may be simplified, and accordingly, the display apparatus may support a high resolution.

Figure 22:
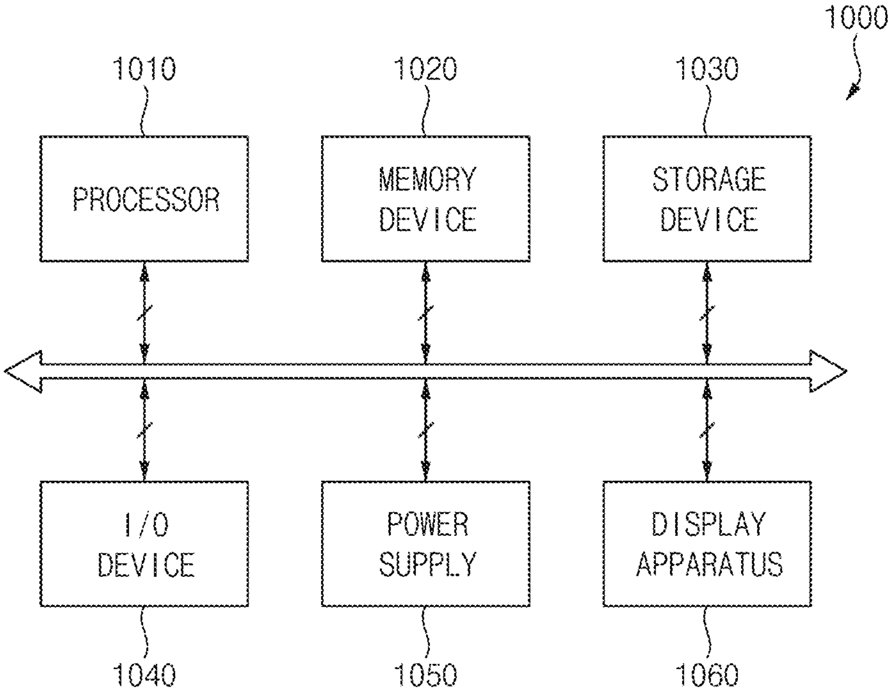
FIG. 22 is a block diagram illustrating an electronic apparatus, according to an embodiment.
Figure 23:
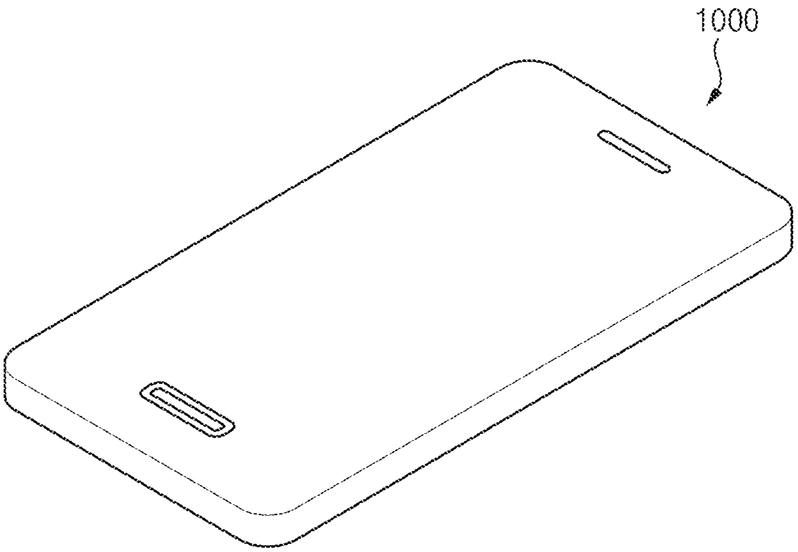
FIG. 23 is a diagram illustrating an example in which the electronic apparatus of FIG. 22 is implemented as a smart phone, according to an embodiment.
Figure 24:
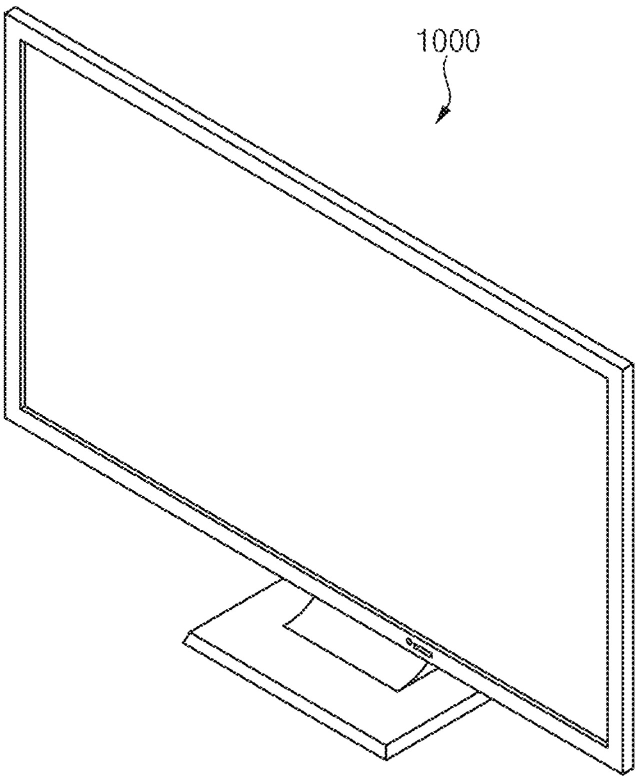
FIG. 24 is a diagram illustrating an example in which the electronic apparatus of FIG. 22 is implemented as a monitor, according to an embodiment.

FIG. 22 is a block diagram illustrating an electronic apparatus 1000, according to an embodiment. FIG. 23 is a diagram illustrating an example in which the electronic apparatus 1000 of FIG. 22 is implemented as a smart phone, according to an embodiment. FIG. 24 is a diagram illustrating an example in which the electronic apparatus 1000 of FIG. 22 is implemented as a monitor, according to an embodiment.

In an embodiment and referring to FIGS. 22 to 24, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 23, the electronic apparatus 1000 may be implemented as a smartphone. In an embodiment, as illustrated in FIG. 24, the electronic apparatus 1000 may be implemented as a monitor. However, the electronic apparatus 1000 is not limited thereto. For example, the electronic apparatus 1000 may be implemented as a television, a cellular phone, a video phone, a smart pad, a smart watch, a tablet PC, a car navigation system, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. In an embodiment, the I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

According to embodiments as described above, the structure of the pixel may be simplified, and accordingly, the display apparatus may support a high resolution.

The foregoing is illustrative of the present invention and is not to be construed as limiting thereof. Although a few embodiments of the invention have been described, those skilled in the art will readily appreciate that many modifications of the invention are possible without materially departing from the scope and the novel teachings and advantages of the invention. Accordingly, all such modifications are intended to be included within the scope of the invention. Therefore, it is to be understood that the foregoing is illustrative of the invention and is not to be construed as limited to the specific embodiments disclosed herein which are intended to be included within the scope of the invention. Moreover, the invention or parts of the invention may be combined in whole or in part without departing from the scope of the invention.

What is claimed is:

1. A display apparatus comprising:
a display panel comprising a first pixel;
a data driver configured to output a grayscale data voltage corresponding to input image data provided to the first pixel in a driving mode and to output a sensing data voltage, which is gradually decreased, to the first pixel in a sensing mode; and
a memory configured to store a turned-on voltage at a turned-on time point of a first switching element of the first pixel as the sensing data voltage gradually decreases in the sensing mode.

2. The display apparatus of claim 1, wherein the first pixel comprises:
the first switching element including a control electrode connected to a first node, a first electrode connected to a second node and a second electrode connected to a third node;
a second switching element including a control electrode configured to receive a writing gate signal, a first electrode configured to receive the grayscale data voltage and the sensing data voltage and a second electrode connected to the first node;
a third switching element including a control electrode configured to receive an emission signal, a first electrode connected to the third node and a second electrode connected to a fourth node;
a fourth switching element including a control electrode configured to receive an initialization gate signal, a first electrode connected to the first node and a second electrode configured to receive an initialization voltage;
a storage capacitor including a first electrode configured to receive a first power voltage and a second electrode connected to the first node; and
a light emitting element including a first electrode connected to the fourth node and a second electrode configured to receive a second power voltage,
wherein the second node is configured to receive the first power voltage.

3. The display apparatus of claim 2, wherein the initialization gate signal has an active level during a first driving period,
wherein the writing gate signal has an inactive level in the first driving period, and
wherein the emission signal has the inactive level in the first driving period.

4. The display apparatus of claim 3, wherein the initialization gate signal has the inactive level in a second driving period subsequent to the first driving period,
wherein the writing gate signal has the active level in the second driving period, and
wherein the emission signal has the inactive level in the second driving period.

5. The display apparatus of claim 4, wherein the initialization gate signal has the inactive level in a third driving period subsequent to the second driving period,
wherein the writing gate signal has the inactive level in the third driving period, and
wherein the emission signal has the active level in the third driving period.

6. The display apparatus of claim 2, wherein the initialization gate signal has an active level in a first sensing period,
wherein the writing gate signal has an inactive level in the first sensing period, and
wherein the emission signal has the inactive level in the first sensing period.

7. The display apparatus of claim 6, wherein the initialization gate signal has the inactive level in a second sensing period subsequent to the first sensing period,
wherein the writing gate signal has the active level in the second sensing period,
wherein the emission signal has the inactive level in the second sensing period, and
wherein the sensing data voltage is configured to gradually decrease from a maximum sensing data voltage in the second sensing period.

8. The display apparatus of claim 2, wherein it is determined that the first switching element of the first pixel is turned on by sensing a voltage of the third node.

9. The display apparatus of claim 8, wherein it is determined that the first switching element is turned on when the voltage of the third node is substantially the same as the first power voltage.

10. The display apparatus of claim 8, wherein the display panel further comprises a second pixel disposed adjacent to the first pixel,
wherein the first pixel is connected to a first sensing line,
wherein the second pixel is not connected to the first sensing line, and
wherein the data driver is configured to output a first compensation data voltage of the first pixel and a second compensation data voltage of the second pixel based on the turned-on voltage of the first switching element of the first pixel.

11. The display apparatus of claim 2, wherein it is determined that the first switching element of the first pixel is turned on by sensing a current of the third node.

12. The display apparatus of claim 11, wherein the display panel further comprises a second pixel disposed adjacent to the first pixel,
wherein the first pixel and the second pixel are commonly connected to a first sensing line, and
wherein the memory is configured to store the turned-on voltage based on a sensed signal received through the first sensing line.

13. The display apparatus of claim 2, wherein it is determined that the first switching element of the first pixel is turned on by sensing a luminance of the light emitting element.

14. The display apparatus of claim 2, wherein the first pixel further comprises:
a fifth switching element including a control electrode configured to receive an anode initialization gate signal, a first electrode configured to receive the initialization voltage and a second electrode connected to the fourth node.

15. The display apparatus of claim 14, wherein the anode initialization gate signal is the writing gate signal.

16. The electronic apparatus of claim 1, wherein the first pixel comprises:
the first switching element including a control electrode connected to a first node, a first electrode connected to a second node and a second electrode connected to a third node;
a second switching element including a control electrode configured to receive a writing gate signal, a first electrode configured to receive the grayscale data voltage and the sensing data voltage and a second electrode connected to the first node;

a third switching element including a control electrode configured to receive an emission signal, a first electrode connected to the third node and a second electrode connected to a fourth node;

a fourth switching element including a control electrode configured to receive an initialization gate signal, a first electrode connected to the first node and a second electrode configured to receive an initialization voltage;

a storage capacitor including a first electrode configured to receive a first power voltage and a second electrode connected to the first node; and a light emitting element including a first electrode connected to the fourth node and a second electrode configured to receive a second power voltage, wherein the second node is configured to receive the first power voltage.

17. A method of driving a display apparatus, the method comprising:

outputting a sensing data voltage to a first pixel in a sensing mode, wherein the sensing data voltage is gradually decreased;

storing a turned-on voltage at a turned-on time point of a first switching element of the first pixel as the sensing data voltage gradually decreases in the sensing mode;

generating a compensation data voltage of the first pixel based on the turned-on voltage in a driving mode; and outputting the compensation data voltage to the first pixel in the driving mode.

18. The method of claim 17, wherein the first pixel comprises:

the first switching element including a control electrode connected to a first node, a first electrode connected to a second node, and a second electrode connected to a third node;

a second switching element including a control electrode configured to receive a writing gate signal, a first electrode configured to receive the grayscale data voltage and the sensing data voltage, and a second electrode connected to the first node;

a third switching element including a control electrode configured to receive an emission signal, a first electrode connected to the third node, and a second electrode connected to a fourth node;

a fourth switching element including a control electrode configured to receive an initialization gate signal, a first electrode connected to the first node, and a second electrode configured to receive an initialization voltage;

a storage capacitor including a first electrode configured to receive a first power voltage, and a second electrode connected to the first node; and a light emitting element including a first electrode connected to the fourth node, and a second electrode configured to receive a second power voltage, wherein the second node is configured to receive the first power voltage.

19. The method of claim 18, wherein the initialization gate signal has an active level in a first driving period, wherein the writing gate signal has an inactive level in the first driving period, wherein the emission signal has the inactive level in the first driving period, wherein the initialization gate signal has the inactive level in a second driving period subsequent to the first driving period, wherein the writing gate signal has the active level in the second driving period, wherein the emission signal has the inactive level in the second driving period, wherein the initialization gate signal has the inactive level in a third driving period subsequent to the second driving period, wherein the writing gate signal has the inactive level in the third driving period, and wherein the emission signal has the active level in the third driving period.

20. The method of claim 18, wherein the initialization gate signal has an active level in a first sensing period, wherein the writing gate signal has an inactive level in the first sensing period, wherein the emission signal has the inactive level in the first sensing period, wherein the initialization gate signal has the inactive level in a second sensing period subsequent to the first sensing period, wherein the writing gate signal has the active level in the second sensing period, wherein the emission signal has the inactive level in the second sensing period, and wherein the sensing data voltage is configured to gradually decrease from a maximum sensing data voltage in the second sensing period.

21. The method of claim 18, wherein it is determined that the first switching element of the first pixel is turned on by sensing a voltage of the third node, and wherein it is determined that the first switching element is turned on when the voltage of the third node is substantially the same as the first power voltage.

22. An electronic apparatus comprising:

a display panel comprising a first pixel;

a data driver configured to output a grayscale data voltage corresponding to input image data provided to the first pixel in a driving mode and to output a sensing data voltage, which is gradually decreased, to the first pixel in a sensing mode;

a driving controller configured to control the data driver;

a processor configured to output the input image data and an input control signal to the driving controller; and a memory configured to store a turned-on voltage at a turned-on time point of a first switching element of the first pixel as the sensing data voltage gradually decreases in the sensing mode.

* * * * *